USO12165270B2

(12) United States Patent
Thiel

(10) Patent No.: US 12,165,270 B2
(45) Date of Patent: Dec. 10, 2024

(54) INGESTING 3D OBJECTS FROM A VIRTUAL ENVIRONMENT FOR 2D DATA REPRESENTATION

(71) Applicant: Zoom Video Communications, Inc., San Jose, CA (US)

(72) Inventor: Jordan Thiel, Leander, TX (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/515,491

(22) Filed: Oct. 31, 2021

(65) Prior Publication Data
US 2023/0136597 A1    May 4, 2023

(51) Int. Cl.
G06T 19/20    (2011.01)
G03H 1/02    (2006.01)
G06T 15/20    (2011.01)
H04L 65/401    (2022.01)
H04N 7/15    (2006.01)

(52) U.S. Cl.
CPC ............... *G06T 19/20* (2013.01); *G03H 1/02* (2013.01); *G06T 15/205* (2013.01); *H04L 65/4015* (2013.01); *H04N 7/157* (2013.01)

(58) Field of Classification Search
None
See application file for complete search history.

(56) References Cited

U.S. PATENT DOCUMENTS

| 2009/0322784 | A1* | 12/2009 | Sartori | H04N 21/42653 345/619 |
| 2014/0150045 | A1* | 5/2014 | Mochinaga | H04N 13/359 725/132 |
| 2018/0130259 | A1* | 5/2018 | Leefsma | G06T 19/20 |
| 2018/0313701 | A1* | 11/2018 | Pulisciano | G01K 11/12 |
| 2020/0118003 | A1* | 4/2020 | Owada | G06N 20/00 |
| 2020/0294317 | A1* | 9/2020 | Segal | G06N 3/08 |
| 2020/0404217 | A1* | 12/2020 | Yerli | H04L 65/61 |
| 2021/0026998 | A1* | 1/2021 | Hoppe | H04L 65/403 |
| 2021/0360196 | A1* | 11/2021 | Oz | H04N 7/144 |
| 2022/0122289 | A1* | 4/2022 | Shang | G06T 17/00 |

(Continued)

OTHER PUBLICATIONS

International Search Report and Written Opinion mailed on Feb. 28, 2023 in corresponding PCT Application Numder PCT/US2022/048346.

(Continued)

*Primary Examiner* — Kee M Tung
*Assistant Examiner* — Jed-Justin Imperial
(74) *Attorney, Agent, or Firm* — Young Basile Hanlon & MacFarlane, P.C.

(57) ABSTRACT

Methods, systems, and apparatus, including computer programs encoded on computer storage media relate to a method for ingesting 3D objects from a virtual environment for 2D data representation. The system may provide a video conference session including a first video stream of a video conference participant and a second video stream of a virtual environment. The system may receive a 3D data representation of a 3D object in the virtual environment and generate a 2D data representation of the 3D object based on the 3D data representation. The system may display the 2D data representation in the video conference session.

20 Claims, 19 Drawing Sheets

(56) References Cited

U.S. PATENT DOCUMENTS

2022/0237735 A1\* 7/2022 Zingade .......... H04N 21/42653
345/619

OTHER PUBLICATIONS

H. Kato et al: "Marker tracking and HMO calibration for a videoÃ-based augmented reality conferencing system", Augmented Reality, 1999. (IWAR '99). Proceedings. 2nd IEEE and ACM International Workshop on San Francisco, CA, USA Oct. 20-21, 1999, Jan. 1, 1999 (Jan. 1, 1999), pp. 85-94, XP055370372, US, DOI: 10.1109/IWAR. 1999.803809, ISBN: 978-0-7695-0359-2.

Wing Ho Leung et al: "Creating a Multiuser 3-D Virtual Environment", IEEE Signal Processing Magazine, IEEE, USA, vol. 18, No. 3, May 1, 2001 (May 1, 2001), pp. 9-16, XP011092344, ISSN: 1053-5888, DOI: 10.1109/79.924884.

Tsang M et al: "Boom Chameleon: Simultaneous Capture of 3D Viewpoint, Voice and Gesture Annotations on a Spatially-Aware Display", UIST 02. Proceedings of the 15th. Annual ACM Symposium on User Interface Software and Technology. Paris, France, Oct. 27-30, 2002; [ACM Symposium on User Interface Software and Technology], New York, NY : ACM, US, vol. Conf. 15, Oct. 27, 2002 (Oct. 27, 2002), pp. 111-120, XP001171573, DOI: 10.1145/571985.572001 ISBN:, ISBN: 978-1-58113-488-9.

\* cited by examiner

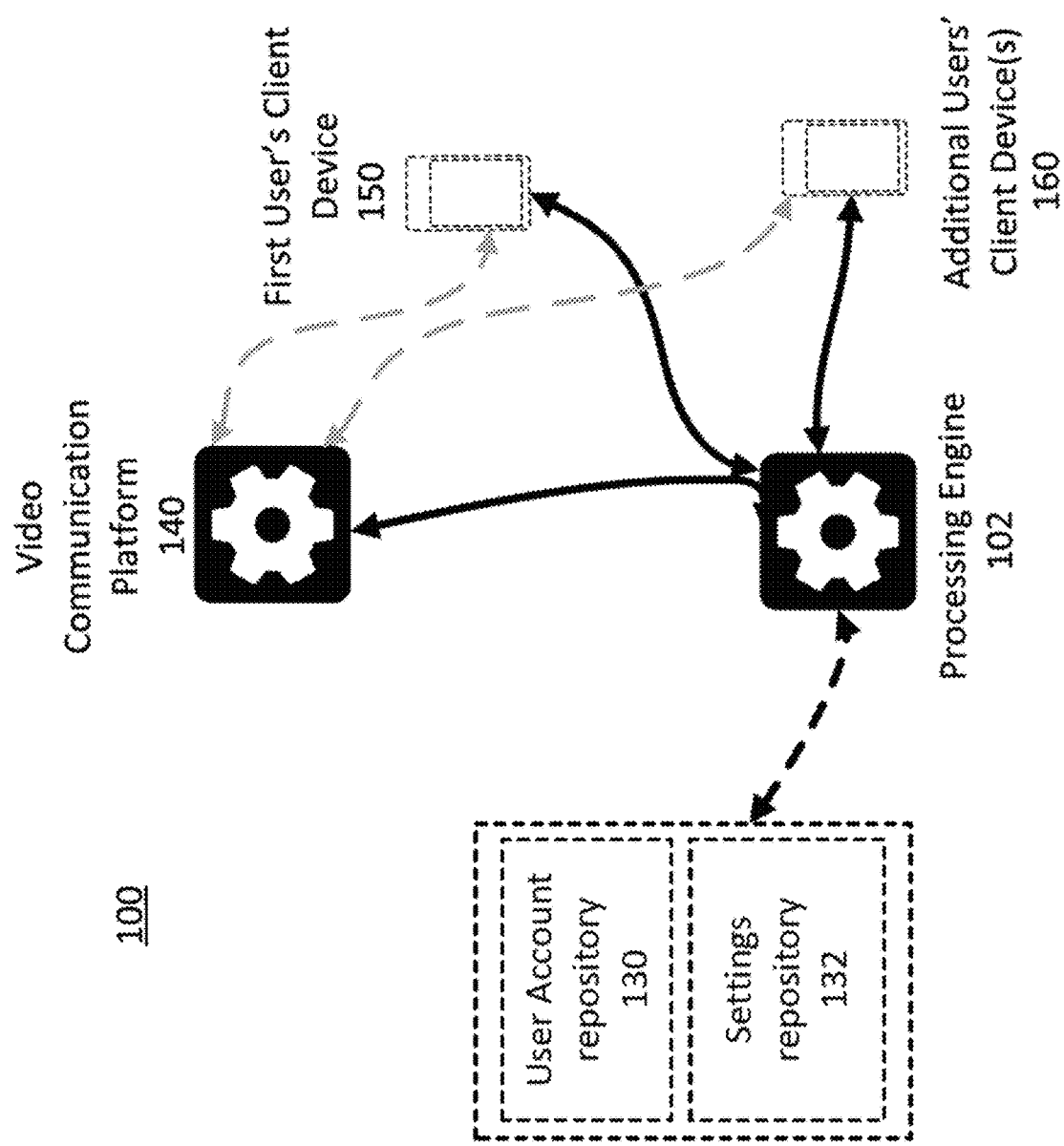

INGESTING 3D OBJECTS FROM A VIRTUAL ENVIRONMENT FOR 2D DATA REPRESENTATION

FIELD

This application relates generally to video communications, and more particularly, to systems and methods for transforming data between a virtual environment and a video communications platform.

SUMMARY

The appended claims may serve as a summary of this application.

BRIEF DESCRIPTION OF THE DRAWINGS

FIG. 1A is a diagram illustrating an exemplary environment in which some embodiments may operate.

DETAILED DESCRIPTION OF THE DRAWINGS

Figure 1B:
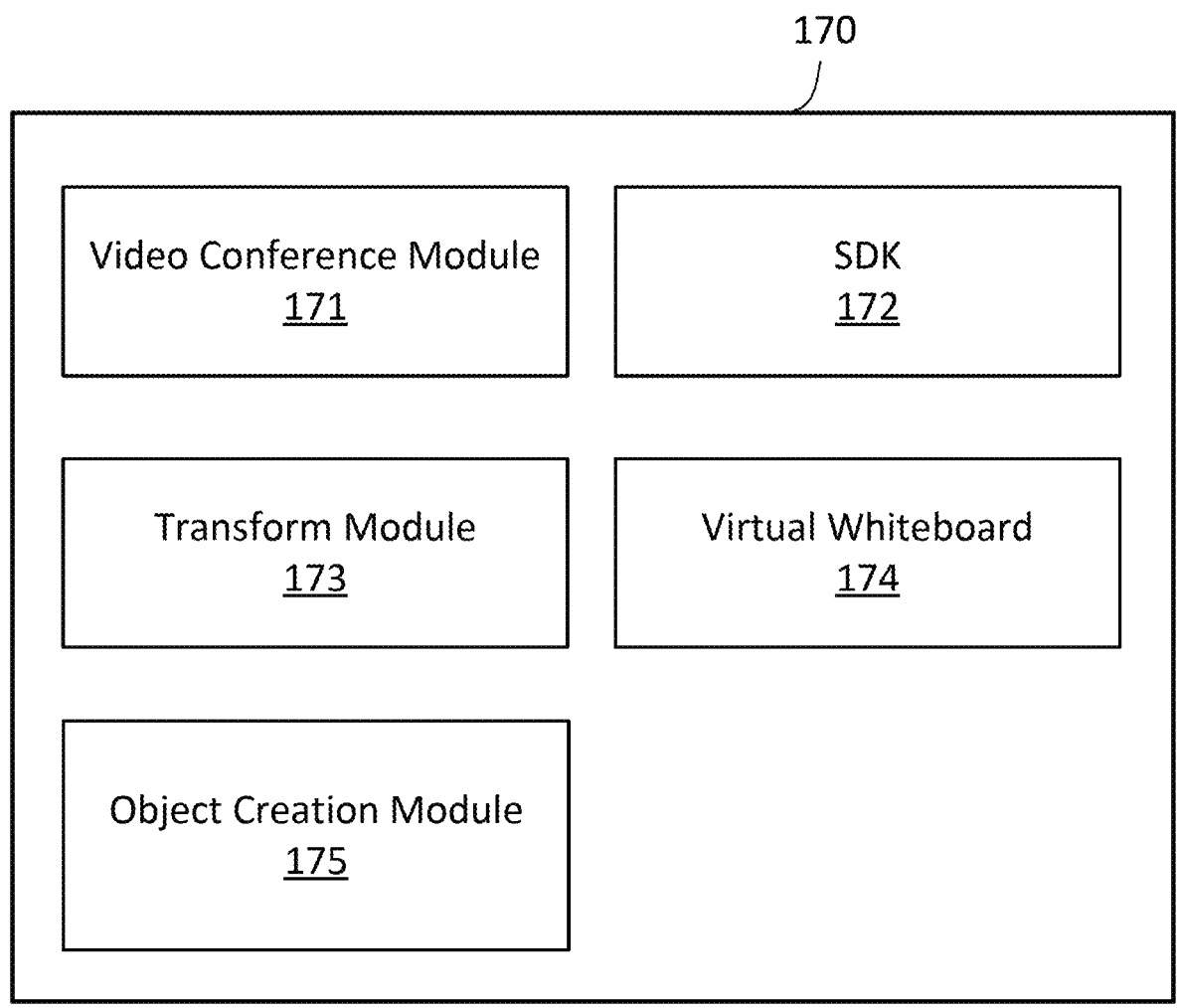
FIG. 1B is a diagram illustrating an exemplary computer system with software and/or hardware modules that may execute some of the functionality described herein.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130 and/or a settings repository 132. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, processing engine 102 may perform the methods 620, 1300, 1400, 1500, 1600, or other methods herein and, as a result, provide for ingesting 3D objects from a virtual environment for 2D data representation. A virtual environment may comprise a VR environment or AR environment. In some embodiments, this may be accomplished via communication with the first user's client device 150, additional users' client device(s) 160, processing engine 102, video communication platform 140, and/or other device(s) over a network between the device(s) and an application server or some other network server. In some embodiments, the processing engine 102 is an application, browser extension, or other piece of software hosted on a computer or similar device or is itself a computer or similar device configured to host an application, browser extension, or other piece of software to perform some of the methods and embodiments herein.

In some embodiments, the first user's client device 150 and additional users' client devices 160 may perform the methods 620, 1300, 1400, 1500, 1600, or other methods herein and, as a result, provide for ingesting 3D objects from a virtual environment for 2D data representation. In some embodiments, this may be accomplished via communication with the first user's client device 150, additional users' client device(s) 160, processing engine 102, video communication platform 140, and/or other device(s) over a network between the device(s) and an application server or some other network server.

The first user's client device 150 and additional users' client device(s) 160 may be devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 may be configured to perform functions related to presenting and playing back video, audio, documents, annotations, and other materials within a video presentation (e.g., a virtual class, lecture, webinar, or any other suitable video presentation) on a video communication platform. The additional users' client device(s) 160 may be configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) 160 are computing devices capable of hosting and executing one or more applications or other programs capable of sending and/or receiving information. In some embodiments, the first user's client device 150 and/or additional users' client device(s) 160 may be a computer desktop or laptop, mobile phone, video phone, conferencing system, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130 and settings repository 132. The user account repository may store and/or maintain user account information associated with the video communication platform 140. In some embodiments, user account information may include sign-in information, user settings, subscription information, billing information, connections to other users, and other user account information. The settings repository 132 may store and/or maintain settings associated with the communication platform 140. In some embodiments, settings repository 132 may include virtual environment settings, virtual reality (VR) settings, augmented reality (AR) settings, audio settings, video settings, video processing settings, and so on. Settings may include enabling and disabling one or more features, selecting quality settings, selecting one or more options, and so on. Settings may be global or applied to a particular user account.

Video communication platform 140 comprises a platform configured to facilitate video presentations and/or communication between two or more parties, such as within a video conference or virtual classroom. In some embodiments, video communication platform 140 enables video conference sessions between one or more users.

FIG. 1B is a diagram illustrating an exemplary computer system 170 with software and/or hardware modules that may execute some of the functionality described herein. Computer system 170 may comprise, for example, a server or client device or a combination of server and client devices for ingesting 3D objects from a virtual environment for 2D data representation.

Video conference module 171 provides system functionality for providing video conferences between one or more video conference participants. Video conference module 171 may comprise part or all of the video communication platform 140 and/or processing engine 102. Video conference module 171 may host a video conference session that enables one or more participants to communicate over video. In some embodiments, video conference module 171 may require users to authenticate themselves to join a video conference, such as by providing credentials like a username and/or password. In some embodiments, video conference module 171 may allow guest users to join a video conference without authenticating themselves and may notify participants in the meeting that one or more unauthenticated participants are present. A video conference session may include one or more video streams that each display one or more of the participants, or other scenes such as a screen-share or a virtual environment as described herein. In an embodiment, synchronized audio may be provided with the video streams.

Software development kit (SDK) 172 provides system functionality for enabling an application to interface with the video conference module 171. In some embodiments, SDK 172 may comprise an application programming interface (API). SDK 172 may be distributed to enable software developers to use functionality of the video conference module 171 in first party or 3rd party software applications. In some embodiments, SDK 172 may enable first party or $3^{rd}$ party software applications to provide video communication such as video conferencing via the video communication platform 140 and processing engine 102. In some embodiments, SDK 172 may enable VR or AR applications to integrate video communication into a virtual environment.

Transform module 173 provides system functionality for transforming an object in a virtual environment into a 2D representation for display in a video conference. The virtual environment may comprise a VR or AR environment. In some embodiments, a 3D object is displayed in a virtual environment and transformed into a 2D representation of the 3D object for display in a video conference session. In an embodiment, the 2D representation may comprise a 2D view of the 3D object. In an embodiment, the 2D representation may be stored in a virtual whiteboard 174 of a video conference system, where the 2D representation and other contents of the virtual whiteboard 174 may be edited by one or more participants. In some embodiments, an AR object, such as a hologram, is displayed in a virtual environment and transformed into a 2D representation of the AR object for display in a video conference session. In an embodiment, the 2D representation may be edited in the video conference session by one or more participants. In some embodiments, transform module 173 may provide system functionality for transforming a 2D representation in a video conference into an object in the virtual environment. For example, when an object in the virtual environment is transformed into a 2D representation, transform module 173 may provide functionality for performing the reverse transformation to expand the 2D representation to the original object in the virtual environment. In some embodiments, transform module 173 may enable participants to create a 2D representation in a video conference and transform it into an object in the virtual environment.

Virtual whiteboard 174 provides system functionality for a virtual collaboration space. In some embodiments, virtual whiteboard 174 may allow functionality such as creating and editing objects, drawing, erasing, creating and deleting text or annotations, and so on. In an embodiment, one or more participants in a video conference session may share one or more virtual whiteboards 174 where they may collaborate and share information. In some embodiments, the contents of one or more virtual whiteboards 174 may be stored for retrieval at a later date. In some embodiments, contents of one or more virtual whiteboards 174 may be combined with other virtual whiteboards 174, such as by importing the content of virtual whiteboard into another virtual whiteboard.

Object creation module 175 provides system functionality for video conference participants to create objects in a video conference. Objects may comprise 2D or 3D representations of real-world objects such as a car, house, and so on, primitives such as a square, circle, and so on, text, annotations, or any other object. In some embodiments, a library of one or more stock objects may be provided. In some embodiments, object creation module 175 may enable participants to create an object on a virtual whiteboard 174. In some embodiments, object creation module 175 may enable participants to create an object on top of a video stream, such as by creating an object, text, or an annotation. In an embodiment, one or more objects created by the object creation module 175 may be transformed by the transform module 173 into an object in a virtual environment. In some embodiments, an object in a video conference may be transformed into a 3D object in a VR environment or an AR object in an AR environment, which may be interacted with by participants in the VR environment or AR environment.

Figure 2:
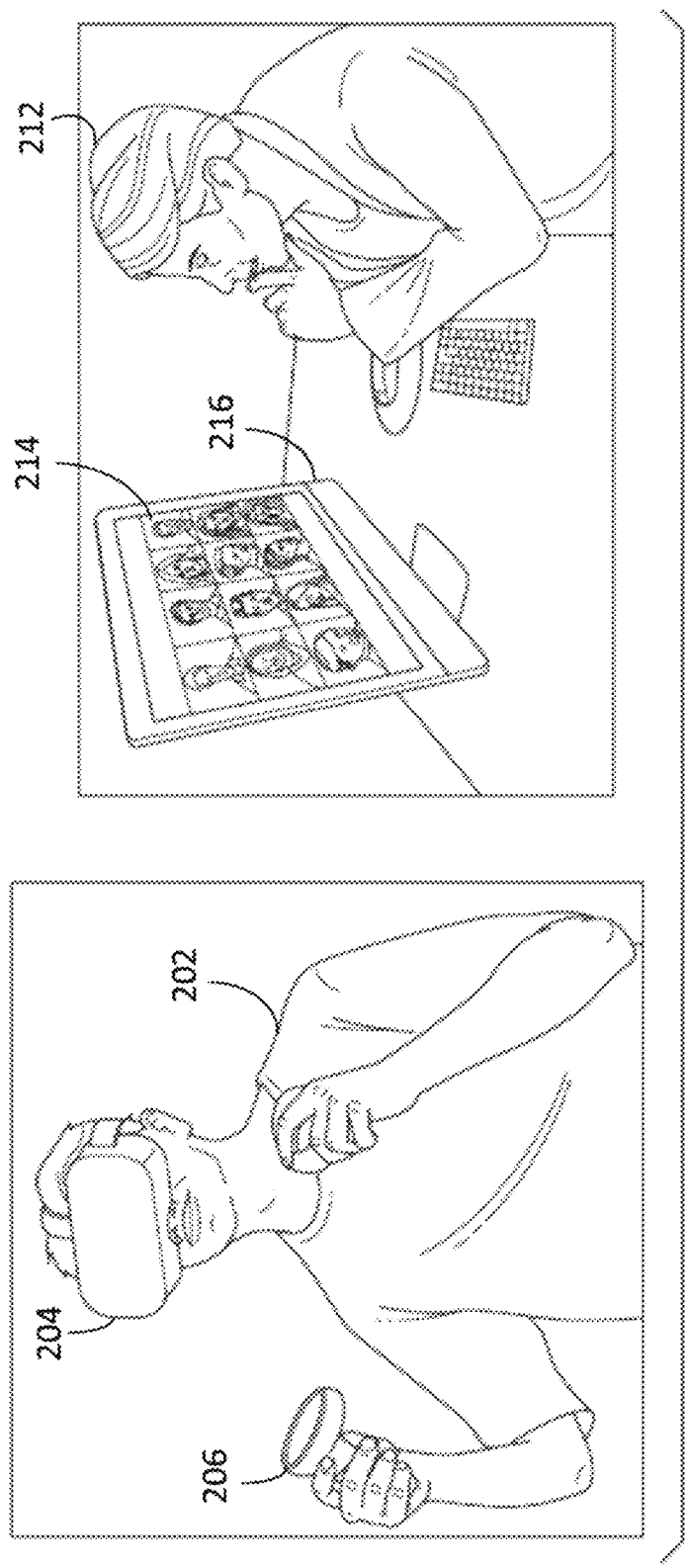
FIG. 2 illustrates one or more client devices that may be used to participate in a video conference and/or virtual environment.

FIG. 2 illustrates one or more client devices that may be used to participate in a video conference and/or virtual environment.

In an embodiment, a VR headset 204 may be worn by a VR user 202 to interact with a VR environment. The VR headset 204 may display 3D graphics to the VR user 202 to represent a VR environment, which may be generated by a VR application. Moreover, the VR headset 204 may track the movement of the VR user's head and/or other body parts to update its display to simulate an experience of being in the VR environment. In an embodiment, a VR headset 204 may optionally include controllers 206 to control the VR application. In some embodiments, the VR headset 204 may enable the VR user 202 to participate in a video conference within a VR environment.

Similarly, in an embodiment, an AR headset may be worn by an AR user to interact with an AR environment. The AR headset may display AR graphics, such as holograms, to the AR user to represent an AR environment, which may be generated by an AR application. The AR application may enable viewing a mixed reality environment that includes some AR objects and some real objects. Moreover, the AR headset may track the movement of the AR user's head or other body parts to update its display to simulate the AR environment. In an embodiment, an AR headset may optionally include controllers to control the AR application. In some embodiments, the AR headset may enable the AR user to participate in a video conference within an AR environment.

In an embodiment, a computer system 216 may provide a video conference application 214 that is communicably connected to video communication platform 140 and processing engine 102. The video conference application 214 may enable a video conference participant 212 to communicate with other participants on a video conference, including participants joining from video conference application 214 or VR headset 204 or an AR headset.

Figure 3:
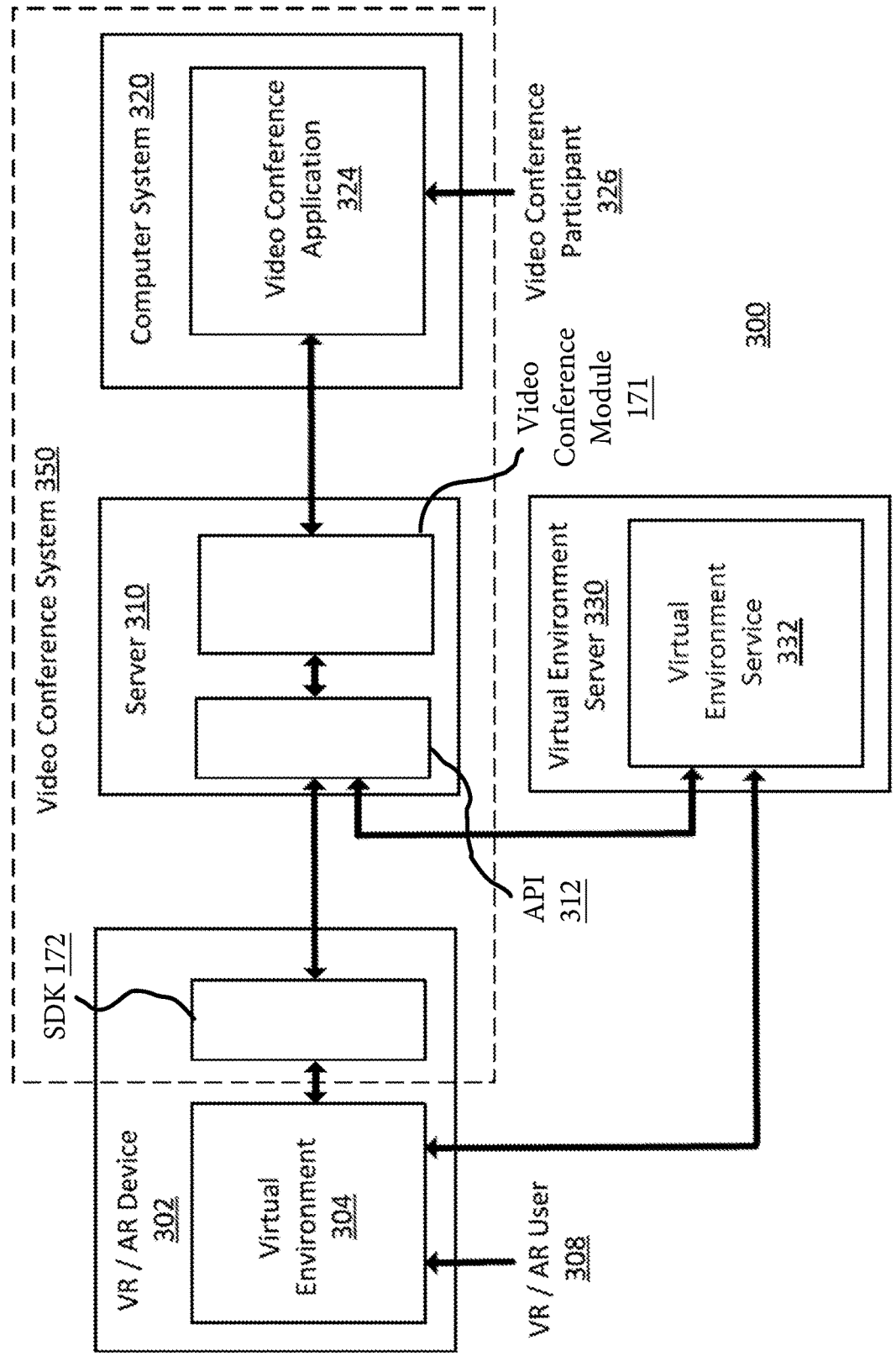
FIG. 3 is a diagram illustrating an exemplary environment in which some embodiments may operate.

FIG. 3 is a diagram illustrating an exemplary environment 300 in which some embodiments may operate. In an embodiment, computer system 320 provides a video conference application 324 that enables video conference participant 326 to join a video conference session. The video conference application 324 connects to server 310 hosting video conference module 171. The video conference module 171 may provide system functionality for hosting one or more video conference sessions and connecting one or more participants via video communication.

In an embodiment, a VR/AR device 302, which may comprise a VR or AR device such as a headset, displays a virtual environment 304, which may comprise a VR environment or AR environment. VR/AR user 308, which may comprise a VR or AR user, may interact with the virtual environment 304 using the VR/AR device 302. Virtual environment 304 may connect with SDK 172 on VR/AR device 302. SDK 172 enables the virtual environment 304, which may comprise a VR or AR application, to connect to API 312 on server 310. The API 312 may provide access to functionality of video conferencing module 171. Virtual environment 304 may be enabled to provide access to video conference sessions that may include other VR/AR users and video conference participant 326 through SDK 172, API 312, and video conference module 171.

In an embodiment, virtual environment 304 may connect to virtual environment service 332 on virtual environment server 330. In an embodiment, the virtual environment service 332 may host a backend of the virtual environment 304. The virtual environment service 332 may comprise data and functions for providing the virtual environment 304 to the VR/AR user 308. For example, virtual environment service 332 may store persistent objects and locations in the virtual environment 304 and maintain a consistent virtual world for experience by other VR/AR users who may also join the same virtual environment through their own VR/AR device. In an embodiment, the virtual environment service 332 may optionally connect to the API 312 to communicate data to and from the video conference module 171. For example, the virtual environment service 332 may transmit or receive global data about the virtual environment 304 with the video conference module 171. In an embodiment, the virtual environment server 330 may include a copy of SDK 172 for interfacing between virtual environment service 332 and API 312.

In an embodiment, the computer system 320, video conference application 324, server 310, video conference module 171, API 312, and SDK 172 may comprise aspects of a video conference system 350. In an embodiment, the virtual environment 304, virtual environment server 330, and virtual environment service 332 may comprise aspects of a 3$^{rd}$ party VR or AR application. Alternatively, the virtual environment 304, virtual environment server 330, and virtual environment service 332 may comprise aspects of a first party VR/AR application that comprise further aspects of video conference system 350.

II. Exemplary Systems

Figure 4:
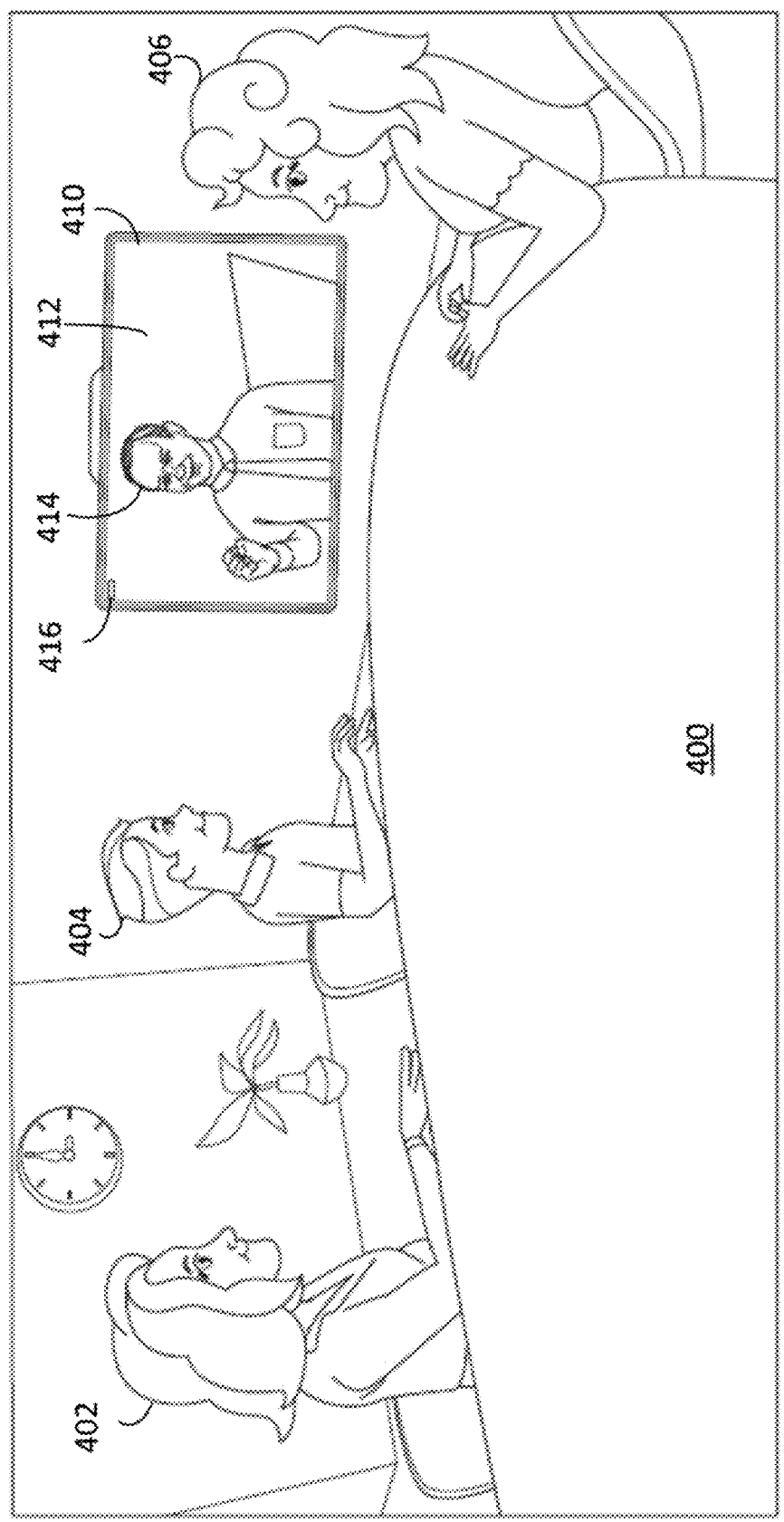
FIG. 4 illustrates an exemplary virtual environment according to one embodiment of the present disclosure.

FIG. 4 illustrates an exemplary virtual environment 400 according to one embodiment of the present disclosure. The virtual environment 400 may comprise a VR environment such as a 3D world including digital representations, such as 3D avatars 402, 404, 406, of one or more users. Digital representations may also comprise 2D representations, such as images, videos, sprites, and so on. Each of the digital representations may represent a VR user who is viewing and interacting with the virtual environment 400 from a VR device. The virtual environment 400 may be displayed to each VR user from the perspective of their digital representations. The virtual environment 400 is illustrated as an indoor conference room, but any other virtual environment may also be presented such as representations of outdoor areas, video game worlds, and so on.

Video conference view 410 in virtual environment 400 may display a video stream 412 including real-time video of video conference participant 414. The video may be captured from the camera of the computer system of the video conference participant 414. The VR application may receive video stream 412 from video conference module 171 through SDK 172 and render the video stream 412 on the surface of a 3D object in the virtual environment 400, such as a 3D representation of a screen, projector, wall, or other object. In an embodiment, the video conferencing application may run in the virtual environment 400. VR application may render a user interface 416 of the video conferencing application that may contain the video stream 412. The user interface 416 may also be rendered on the surface of a 3D object.

Figure 5:
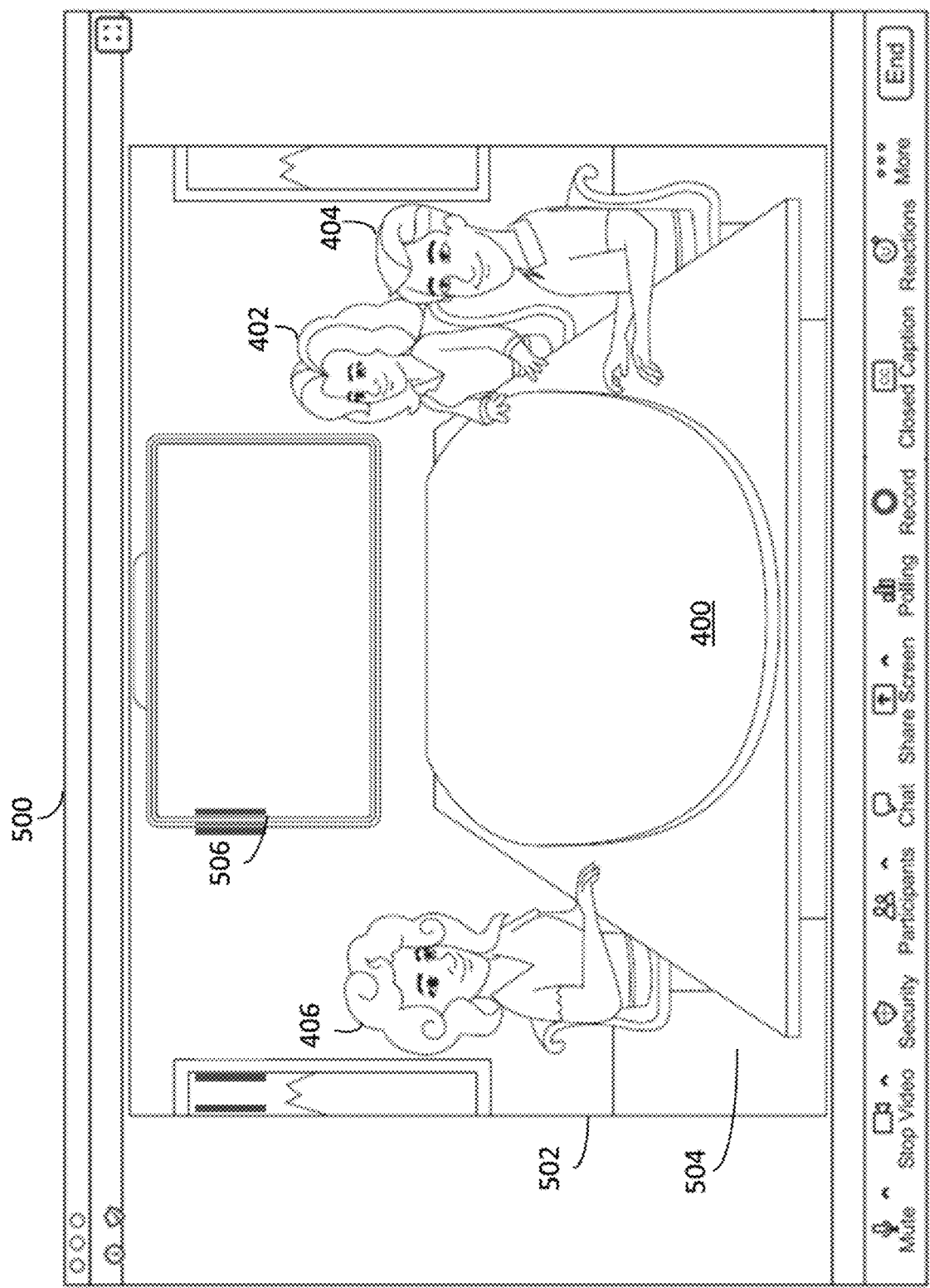
FIG. 5 illustrates an exemplary user interface according to one embodiment of the present disclosure.

FIG. 5 illustrates an exemplary user interface 500 according to one embodiment of the present disclosure. User interface 500 may comprise the interface of a video conferencing application. Content view 502 displays a view of the virtual environment 400, including the 3D avatars 402, 404, 406 of participants in the video conference. Virtual environment 400 may include a virtual whiteboard 506. The content view 502 may comprise video content 504, such as streaming video, captured from a virtual camera in the virtual environment 400. The video content may be encoded in streaming video format by an encoder on a VR/AR device 302 or a server 310. In some embodiments, the encoder may comprise SDK 172. In an embodiment, the video content may comprise 2D video formats such as MP4, MP3, AVI, FLV, WMV, and other formats. The video content may be transmitted from the VR/AR device 302 to the video conference module 171 of the server 310 and on to the computer system 320 and video conference application 324. User interface 500 may be displayed on a computer system to a video conference participant 326. In an embodiment, user interface 500 may be displayed on the surface of a 3D object to display the video conferencing application in a virtual environment 400, such as user interface 416. In an embodiment, user interface 500 may include one or more user interface controls for controlling the video conference, sharing the screen, recording, and so on.

Figure 6A:
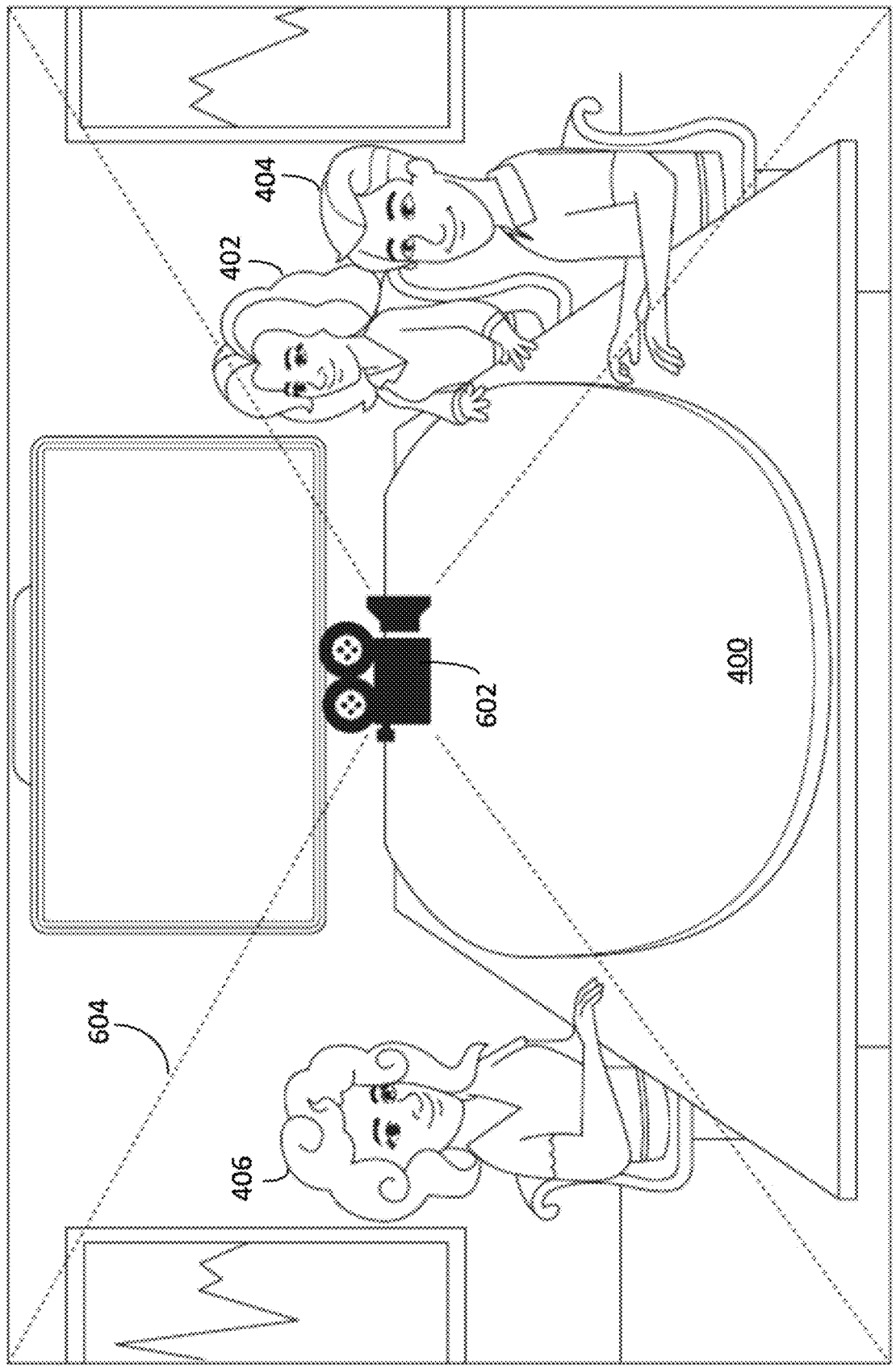
FIG. 6A illustrates an exemplary virtual environment according to one embodiment of the present disclosure.

FIG. 6A illustrates an exemplary virtual environment 400 according to one embodiment of the present disclosure. Virtual camera 602 captures a view of the virtual environment 400 comprising viewport 604. A viewport 604 may comprise a view of a 3D environment that is captured from a position in the 3D environment. The virtual camera 602 may generate video content based on the portion of the 3D environment that is within the viewport 604 for transmitting to a video conference application. In an embodiment, the virtual camera 602 may be moved to different positions in the virtual environment 400 and may be faced in different directions via rotations about any axis. In an embodiment, one or more aspect of the virtual camera 602 may be configurable such as aspect ratio, zoom, front and back clipping planes, frame rate, and so on. In an embodiment, the virtual camera 602 may have the same location and same facing direction as the location and facing direction of the video stream 412 in the virtual environment 400 to enable the video conference participant to view the virtual environment 400 from the perspective of where the video stream 412 and video conference application are displayed in the virtual environment 400.

Figure 6B:
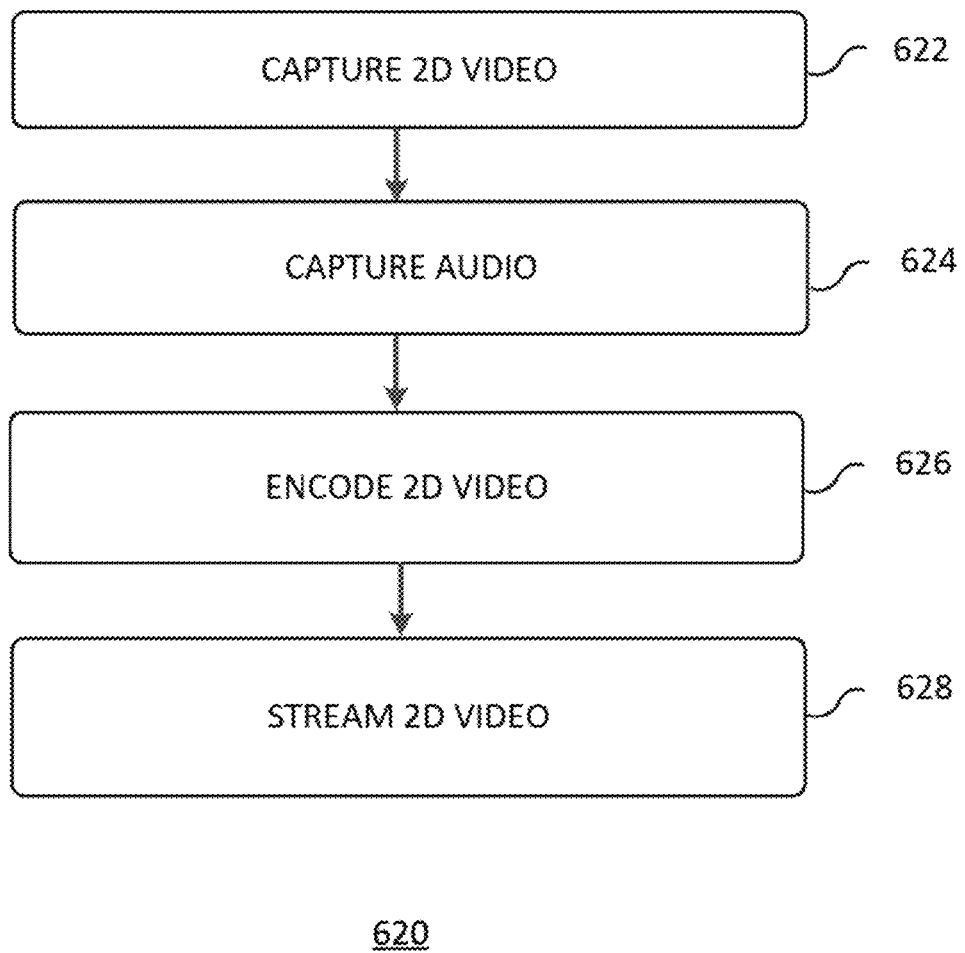
FIG. 6B illustrates an exemplary method that may be performed in some embodiments.

FIG. 6B illustrates an exemplary method 620 that may be performed in some embodiments. Video content may be captured from the virtual environment 400 in many different ways, and method 620 comprises one exemplary method for doing so. At step 622, a video conference application or VR/AR application captures 2D video of a 3D virtual environment. In an embodiment, the 2D video may be captured from the viewport of a virtual camera. At step 624, the video conference application or VR/AR application may capture audio output from the virtual environment and/or from the microphone input of the VR/AR device. At step 626, the video conference application or VR/AR application may encode the 2D video. In some embodiments, the 2D video may be encoded into a streaming video format and may include the audio output. The encoding may be compressed or uncompressed. At step 628, the video conference application may stream the 2D video to a video conference module and one or more client devices.

Figure 7:
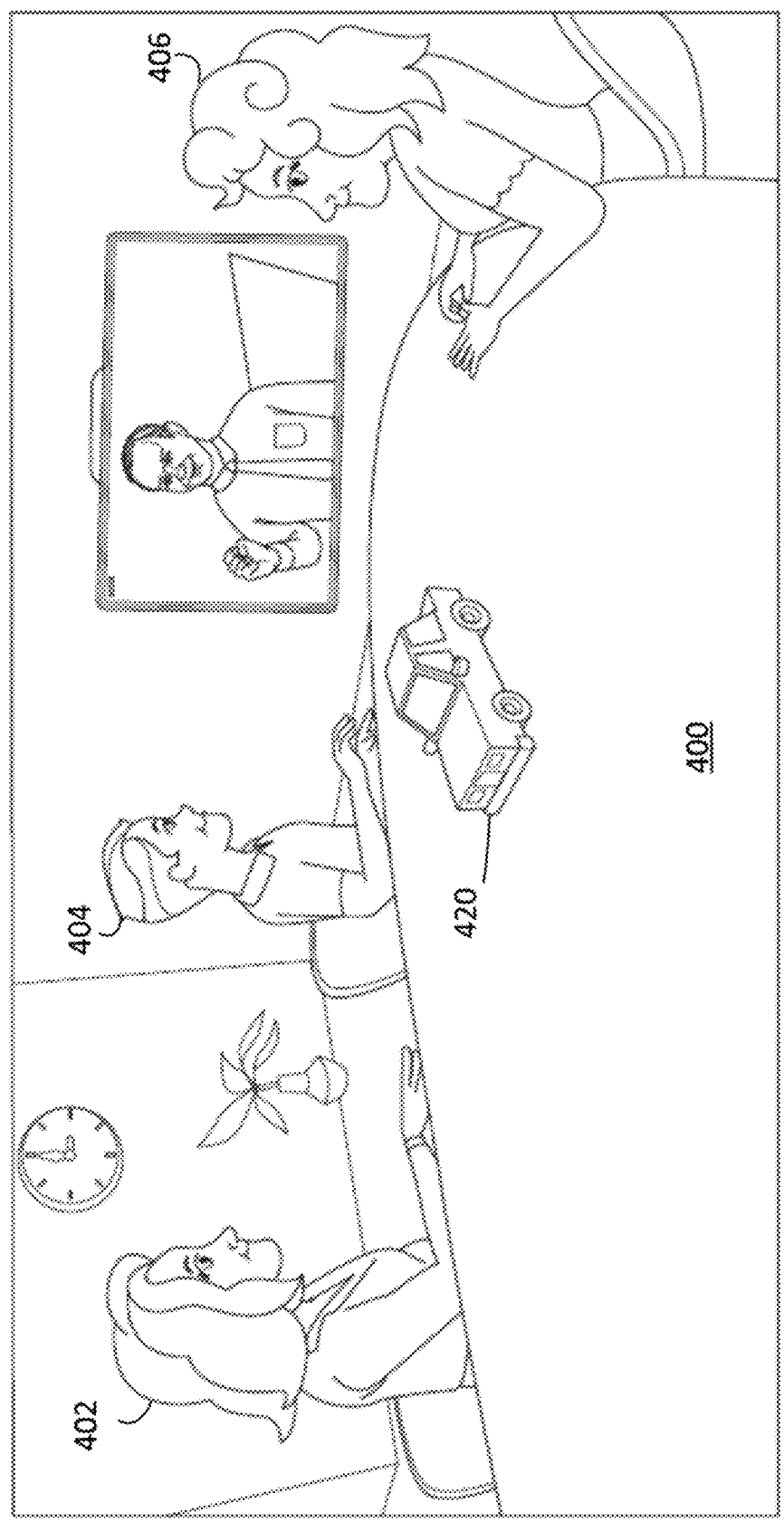
FIG. 7 illustrates an exemplary virtual environment according to one embodiment of the present disclosure.

FIG. 7 illustrates an exemplary virtual environment 400 according to one embodiment of the present disclosure. In an embodiment, virtual environment 400 may include a 3D object 420. The 3D object may be of any type, such as representing a real-world object like a car, a shape, a 3D effect, a document, text, a whiteboard, or other 3D objects. VR/AR users 308 in the environment may interact with the 3D object 420 using their VR/AR devices 302.

In an embodiment, VR/AR users 308 may create or generate 3D object 420 in one or more ways. In an embodiment, user interface controls may provide for importing the 3D object 420 from a 3D computer graphics application, 3D engine, document, file, presentation, or other source. In an embodiment, user interface controls may provide for importing the 3D object 420 from a library of 3D objects, such as library of stock objects. In an embodiment, user interface controls may provide for creating the 3D object 420 may combining one or more shapes or subtracting one or more shapes from an object. In an embodiment, user interface controls may provide for creating or molding 3D object 420 from a 3D mesh.

In an embodiment, VR/AR users may manipulate the 3D object 420 in the virtual environment 400. In an embodiment, user interface controls may provide for moving the 3D object 420 to a new location in the environment, rotating the 3D object 420, and scaling the 3D object 420. In an embodiment, 3D object 420 may include one or more 3D models at different levels of detail, which may be displayed based on how close or far away VR/AR users 308 are from the 3D object 420. In an embodiment, user interface controls may provide for editing the 3D object 420 in the virtual environment 400. In an embodiment, user interface controls may provide for adding or removing parts of the 3D object 420 or editing a 3D mesh of the 3D object 420. In an embodiment, user interface controls may provide for editing aspects of the 3D object 420 such as color, texture, and other aspects.

Figure 8:
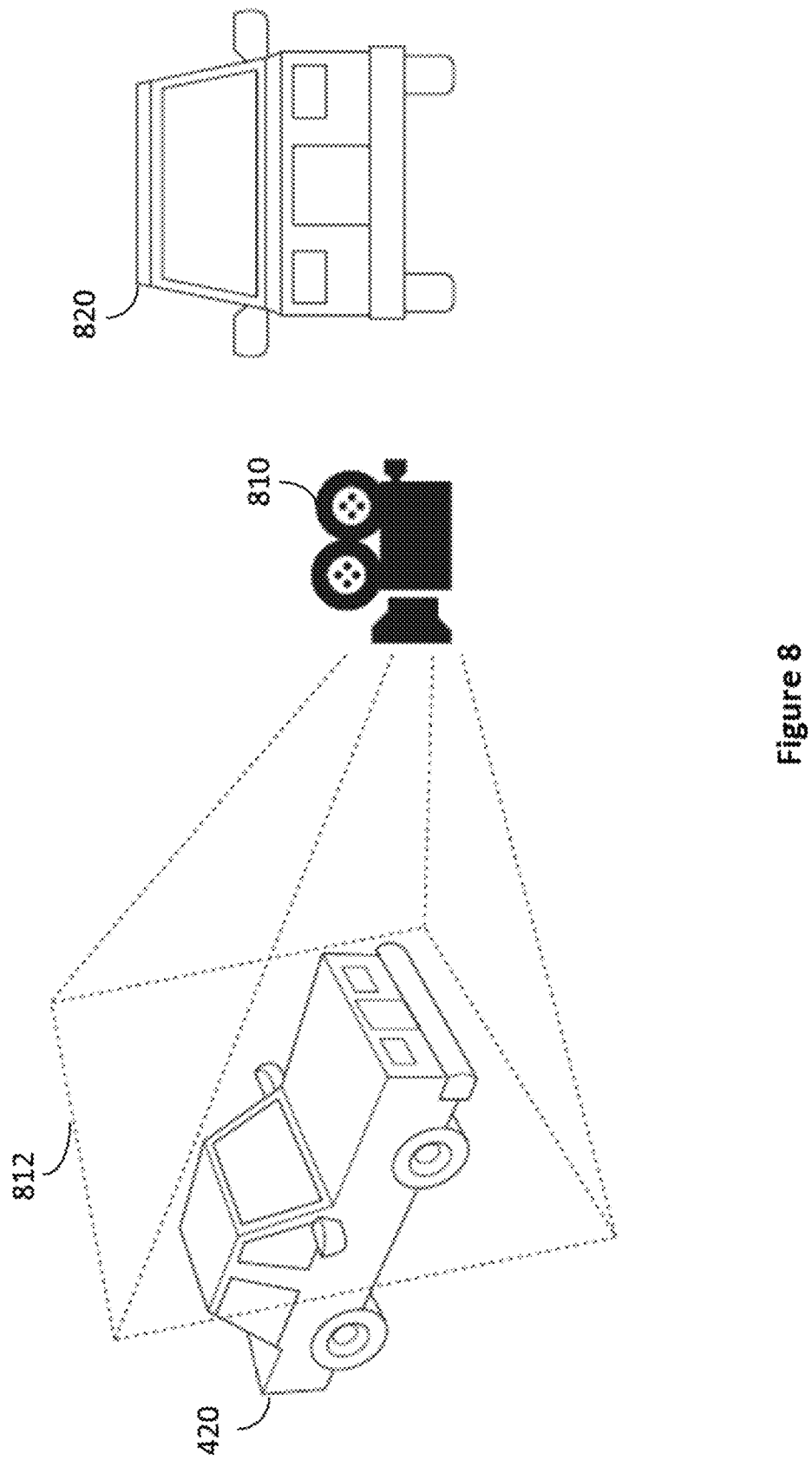
FIG. 8 illustrates an exemplary aspect of transforming a 3D object to a 2D representation according to one embodiment of the present disclosure.

FIG. 8 illustrates an exemplary aspect of transforming a 3D object 420 to a 2D representation 820 according to one embodiment of the present disclosure. In an embodiment, SDK 172 may provide for ingesting one or more 3D objects into 2D data representations in a video conference. In an embodiment, 3D object 420 may be transformed from a 3D representation in virtual environment 400 to a 2D representation 820 for use in a video conference application. To convert the 3D object 420 to 2D, a virtual camera 810 may be positioned at a viewpoint directed at the object. The 3D object 420 may be located within the viewport 812 of the virtual camera 810. Virtual camera 810 captures an image of the 3D object 420 from the viewport 812, the image comprising a 2D representation 820 of the 3D object 420. In one embodiment, SDK 172 performs the functionality of capturing the image of the 3D object 420 and generating the 2D representation 820. In an embodiment, SDK 172 may transmit the 2D representation 820 to a video conference server and one or more client devices comprising video conference applications.

The image of the 3D object 420 may be captured from any of one or more different angles or perspectives, such as by moving the virtual camera 810 to capture the 3D object 420 from a different viewpoint. For example, the image may be captured head-on, from the side, from behind, from an isometric perspective, or other directions. In an embodiment, user interface controls may enable one or more video conference participants to move virtual camera 810 and customize the capture of the 2D representation 820 from 3D object 420. In an embodiment, user interface controls may enable one or more video conference participants to customize other aspects of the image capture such as the aspect ratio, scale, sharpness, image filters and effects, and so on. In an embodiment, virtual camera 810 may include a default position and facing direction for appropriately capturing 3D object 420.

In an embodiment, the 2D representation 820 may be encoded in one or more image formats such as Portable Network Graphics (PNG), Joint Photographic Experts Group (JPEG), WebP, or other formats. In an embodiment, the 2D representation 820 may be encoded in vector graphics formats such as Scalable Vector Graphics (SVG) or other formats. In an embodiment, the 2D data representation 820 may comprise a collection of a plurality of 2D sub-objects representing different parts of the 2D data representation 820.

The 2D representation 820 may be stored in a container in the video conference application, such as a virtual whiteboard 174, memory buffer, data structure, database, and so on. The container may be stored on a client device and/or a video conference server. In an embodiment, the 2D representation 820 may be persistently stored across video conference sessions. In an embodiment, the 2D representation 820 may be retrieved from the container in a different video conference session than the one where it was created and displayed to one or more participants.

In an embodiment, virtual environment 400 may provide 3D data about the 3D object 420 to the SDK 172. The SDK 172 may attach the 3D data to the 2D representation 820 to preserve the 3D data for transforming the 2D representation 820 back into a 3D object 420 in the virtual environment 400. For example, the 2D representation 820 may be expanded into 3D object 420 in the same session or a later session in virtual environment 400. The 3D data may comprise the 3D location of the 3D object 420 in the virtual environment 400, data about the pose of the 3D object 420 such as facing direction and orientation, a 3D representation of the 3D object 420 itself such as a 3D mesh, and so on. In an embodiment, user interface controls may provide for transferring a 2D representation 820 in the video conference application to the virtual environment 400. For example, user interface controls may enable a video conference participant to drag, move, or import a 2D representation 820 from the video conference, such as in a virtual whiteboard 172, to the virtual environment 400. In an embodiment, SDK 172 may transform the 2D representation 820 into 3D object 420 based on the stored 3D data. 3D object 420 may be placed in the virtual environment 400 in a location and pose based on the 3D data.

Figure 9:
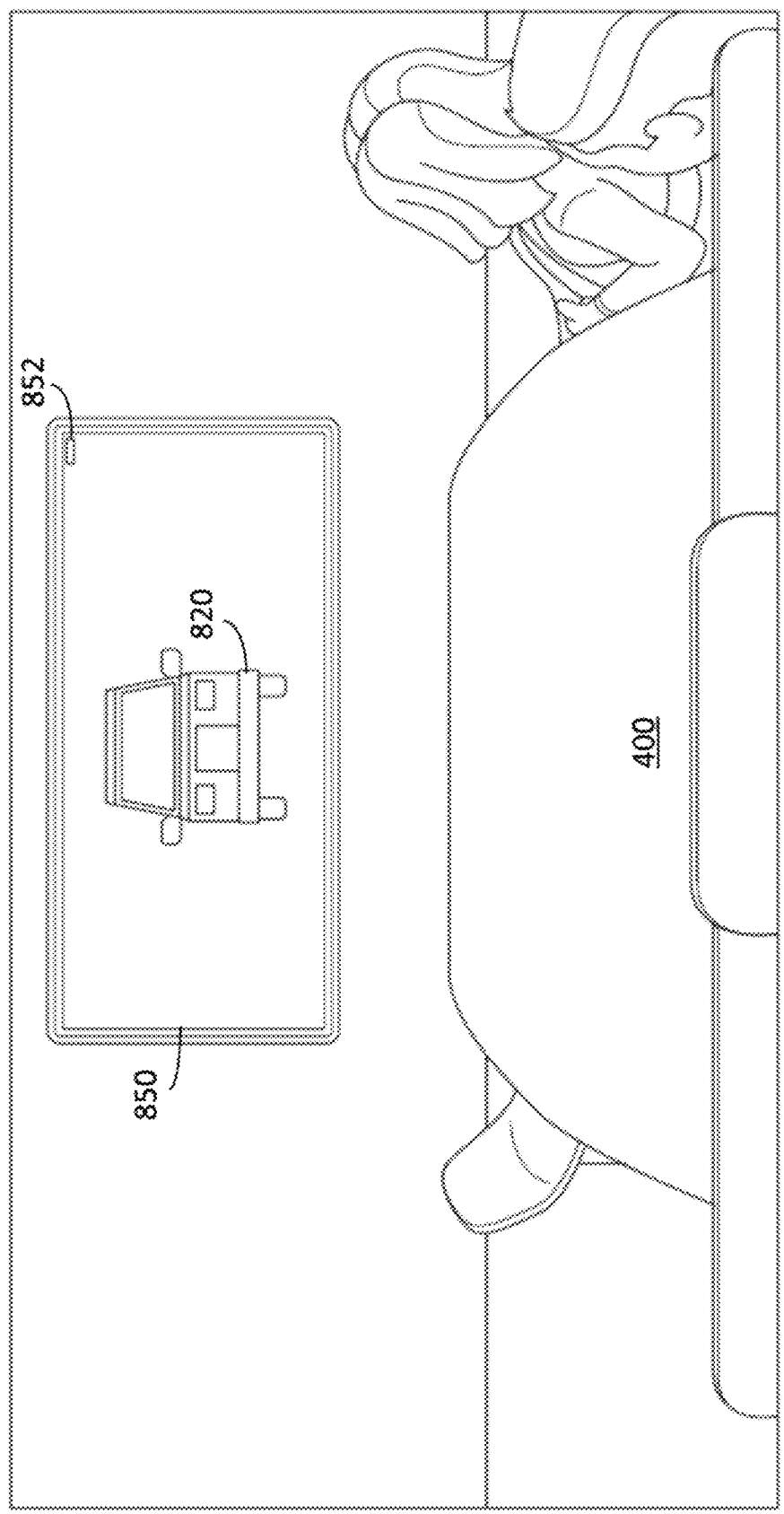
FIG. 9 illustrates an exemplary virtual environment according to one embodiment of the present disclosure.

FIG. 9 illustrates an exemplary virtual environment 400 according to one embodiment of the present disclosure. In an embodiment, 2D representation 820 may be received into the video conference application and displayed on a virtual whiteboard 850 in virtual environment 400. In an embodiment, virtual environment 400 includes a video conference application running on VR/AR device 302 and displayed in the virtual environment. For example, the video conference application may be displayed on a surface or as a hologram in the virtual environment 400. The video conference application interface 852 may be displayed in the virtual environment 400. The video conference application interface 852 may include a video stream, virtual whiteboard 850, or other video conference view.

In an embodiment, the 2D representation 820 is displayed on a virtual whiteboard 850 in a video conference application in the virtual environment 400. In an embodiment, SDK 172 and/or virtual environment 400 may display an animation showing the 3D object 420 being transformed into a 2D representation 820 and being moved from the virtual environment 400 into a 2D environment of the virtual whiteboard 850. A virtual whiteboard toolbar may be displayed on the virtual whiteboard 850 and include one or more user interface controls for interacting with the virtual whiteboard 850. Virtual whiteboard toolbar may include user interface controls for adding and editing content on the virtual whiteboard 850, including the 2D representation 820 and other objects and content on the virtual whiteboard 850. In an embodiment, the virtual whiteboard 850 may receive edits from one or more VR/AR users 308 simultaneously or one at a time.

Figure 10:
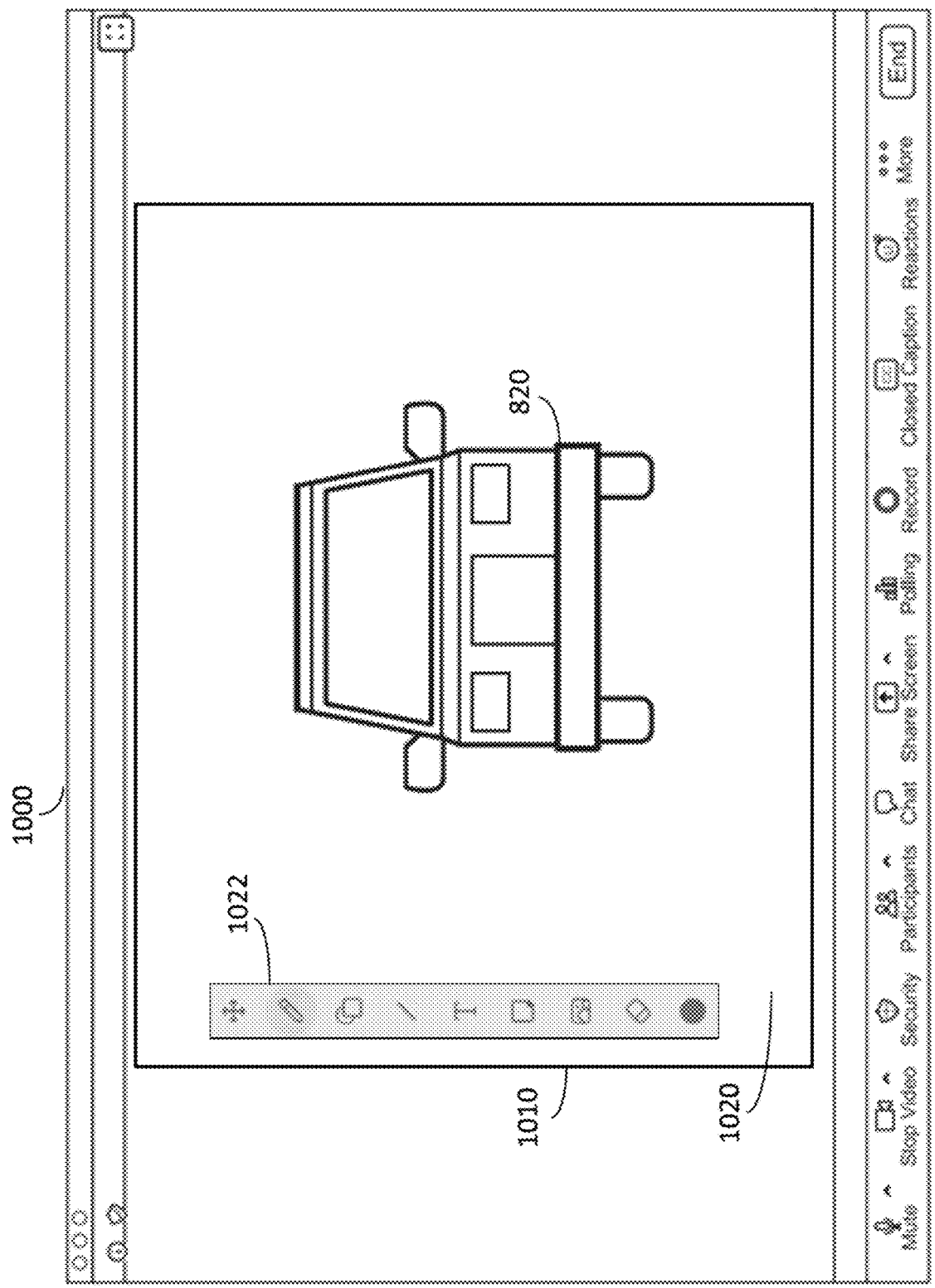
FIG. 10 illustrates an exemplary user interface according to one embodiment of the present disclosure.

FIG. 10 illustrates an exemplary user interface 1000 according to one embodiment of the present disclosure. User interface 1000 of a video conference application may comprise a content view 1010 displaying a virtual whiteboard 1020. Virtual whiteboard 1020 may comprise a view of the same whiteboard displayed to VR/AR users 308 in virtual environment 400 to enable video conference participants 326 to collaborate together with VR/AR users 308 on the same whiteboard. In an embodiment, virtual whiteboard 1020 may display 2D representation 820 that may be transferred to the virtual whiteboard 1020 from the virtual environment 400. Virtual whiteboard 1020 may include user interface controls for interacting with the virtual whiteboard 1020. Virtual whiteboard toolbar 1022 may include user interface controls for adding and editing content on the virtual whiteboard 1020, including the 2D representation 820 and other objects and content on the virtual whiteboard 1020. In an embodiment, virtual whiteboard toolbar 1022 may include user interface controls for adding, deleting, or editing objects; adding, deleting, or editing text; adding, deleting, or editing annotations; drawing shapes; adding, deleting, or editing whiteboard pages, and so on. In an embodiment, user interface controls may enable additional modes of editing such as filters, scripts, rotation, scaling, skewing, and so on. In an embodiment, virtual whiteboard 1020 may receive edits from one or more VR/AR user 308 and video conference participants 326 simultaneously or one at a time.

In an embodiment, 2D representation 820 may include 3D data about the underlying 3D object 420, which may enable user interface controls for editing the 3D object 420 on the virtual whiteboard 1020. In an embodiment, virtual whiteboard 1020 may provide a 3D environment where 3D edits may be performed on a 3D object 420 that is displayed based on 3D data attached to 2D representation 820. In an embodiment, user interface controls may be provided for editing the 3D object 420, such as adding or removing parts of the 3D object, changing its features, and so on. In an embodiment, user interface controls may be provided for rotating, scaling, or moving the 3D object 420 to change 2D representation 820 to a different 2D view of the 3D object 420. In an embodiment, in response to an edit to 3D object 420, the 2D representation 820 may be changed to reflect the edited 3D object.

In an embodiment, 2D representation 820 may include 3D data about the underlying 3D object 420, and edits made to 2D representation 820 on virtual whiteboard also modify the 3D data so that when the 2D representation 820 is transformed back into 3D object 420 in virtual environment 400 the 3D object 420 is modified based on the edits. In an embodiment, user interface controls may enable editing one or more aspects of the 2D representation 820, such as size, shape, color, and so on, and the edits are propagated to the attached 3D data by making the same edits to the 3D object 420. The modified 2D representation 820 may be transformed back into a modified 3D object 420 in virtual environment 400.

In an embodiment, one or more user interface controls may be provided for a user to create an object on the virtual whiteboard 1020, such as an object representing a real-world object, a shape, text, and other objects. In an embodiment, user interface controls may enable transferring the object on the virtual whiteboard 1020, which may comprise a 2D object, into virtual environment 400. The 2D object may be transformed into a 3D object for display in the virtual environment 400. In one embodiment, the 2D object may be transformed into a flat cut out in the virtual environment 400 by creating a flat shape in the shape of the 2D object and texturing the flat shape with the 2D object. In one embodiment, the 2D object may be displayed as a 2D object in 3D space. In one embodiment, the 2D object may be extruded in the Z-dimension to transform it into a 3D object in the virtual environment 400. In one embodiment, the 2D object may have a corresponding pre-configured 3D representation that may be inserted when moved to the virtual environment 400. In one embodiment, a machine learning (ML) model comprising a computer vision module may process the 2D object to create volumetric information that approximates the 3D structure of the 2D object based on the pixels of the 2D object and generate a 3D mesh based on the volumetric information. The 3D mesh may be textured with the 2D object and displayed in the virtual environment 400.

In an embodiment, the virtual whiteboard 1020 user interface controls and functionality described herein may also be used by VR/AR users 308 from a virtual whiteboard 850 and video conference application interface 852 in virtual environment 400. For example, user interface 1000 may be displayed on a computer system 320 or as a virtual interface of a video conference application in a virtual environment 400.

Figure 11:
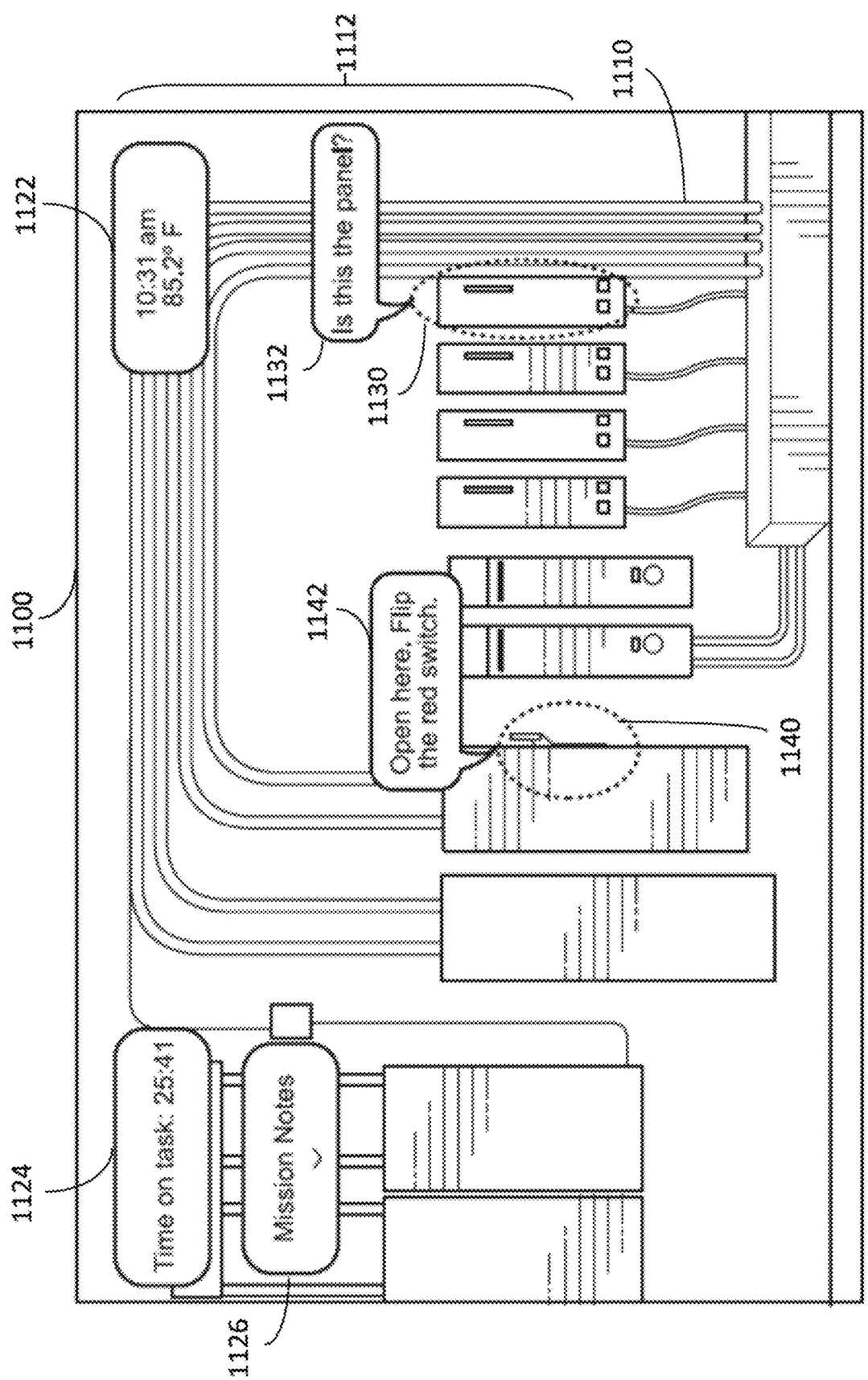
FIG. 11 illustrates an exemplary AR view according to one embodiment of the present disclosure.

FIG. 11 illustrates an exemplary AR view 1100 according to one embodiment of the present disclosure. In an embodiment, AR view 1100 may be displayed by an AR device, such as an AR headset. The AR device may display one or more objects in a virtual environment 1112, comprising an AR environment, overlayed on a real-world environment 1110. The AR view 1100 may comprise a mixed reality view including both AR objects and real-world objects. In an embodiment, AR device may display objects to the user on a screen, through retinal projection, or other AR technologies.

AR view 1100 may include a time display 1122, task display 1124, notes display 1126, AR user drawing 1130, AR user annotation 1132, conference participant drawing 1140, and conference participant annotation 1142. These AR objects may exist in the virtual environment 1112. Time display 1122, task display 1124, and notes display 1126 may comprise displays of information for the AR user. Additional AR objects may be displayed such as objects representing real-world objects, effects, shapes, text, and other objects. In an embodiment, 3D avatars of one or more conference participants may be displayed in the virtual environment 1112. In an embodiment, 3D objects such as tools, arrows, indicators, and other objects may be displayed in the virtual environment 1112.

In an embodiment, user interface controls enable AR user to create objects in the virtual environment 1112, such as AR user drawing 1130. In an embodiment, user interface controls may enable drawing through gestures, physical controls, virtual controls, a stylus, or other user interface controls. In an embodiment, user interface controls may enable creating other AR objects such as representations of real-world objects, shapes, effects, text, and so on. In an embodiment, user interface controls may enable AR user to create an annotation 1132, which may comprise text, images, and/or other objects.

In an embodiment, SDK 172 or AR application may capture video content of the AR view 1100 for transmitting to a video conference. In an embodiment, the video content may comprise an encoded video stream. In an embodiment, a camera on AR device captures video of the real-world environment 1110 from the perspective of the AR user in the environment. A processor may add AR objects in AR view 1100 on top of the captured real-world video. In an embodiment, AR objects in the virtual environment 1112 are captured by a virtual camera in the virtual environment 1112 via a viewport in the same manner as virtual camera 602 captures virtual environment 400. The virtual camera may be located in the virtual environment with a facing direction to determine the viewport. In an embodiment, the virtual camera may be located at the same position and have the same facing direction as the position and facing direction of the AR user in the virtual environment 1112 to capture the perspective of the AR user. The virtual camera may capture video or imagery of AR objects based on the viewport and overlay the AR objects on top of the real-world video. The combined video may be transmitted to a video conference application for display.

In an embodiment, one or more AR objects in the virtual environment 1112 may be transformed to 2D representations in the same manner as described with respect to FIG. 8 and elsewhere herein. An AR object may be transformed from a 3D representation in virtual environment 1112 to a 2D representation for use in a video conference application. A virtual camera like virtual camera 810 may capture an AR object like 3D object 420 based on the viewport of the virtual camera. The virtual camera may capture an image of the 3D object from the viewport, where the image may comprise a 2D representation of the 3D object. In one embodiment, SDK 172 performs the functionality of capturing the image of the AR object and generating the 2D representation. In an embodiment, SDK 172 may transmit the 2D representation to a video conference server and one or more client devices comprising video conference applications.

In an embodiment, the 2D representation of the AR object may be stored in a container in the video conference application, such as a virtual whiteboard 174, memory buffer, data structure, database, and so on. In an embodiment, the 2D representation of the AR object may be edited in the virtual whiteboard 174 in the same manner as other whiteboard content.

In an embodiment, virtual environment 1112 may provide 3D data about the AR object to the SDK 172. The SDK 172 may attach the 3D data to the 2D representation to preserve the 3D data for transforming the 2D representation back into an AR object in the virtual environment 1112. In an embodiment, 3D data may include data about a real-world location of the AR object, opacity data, and other AR data.

Figure 12:
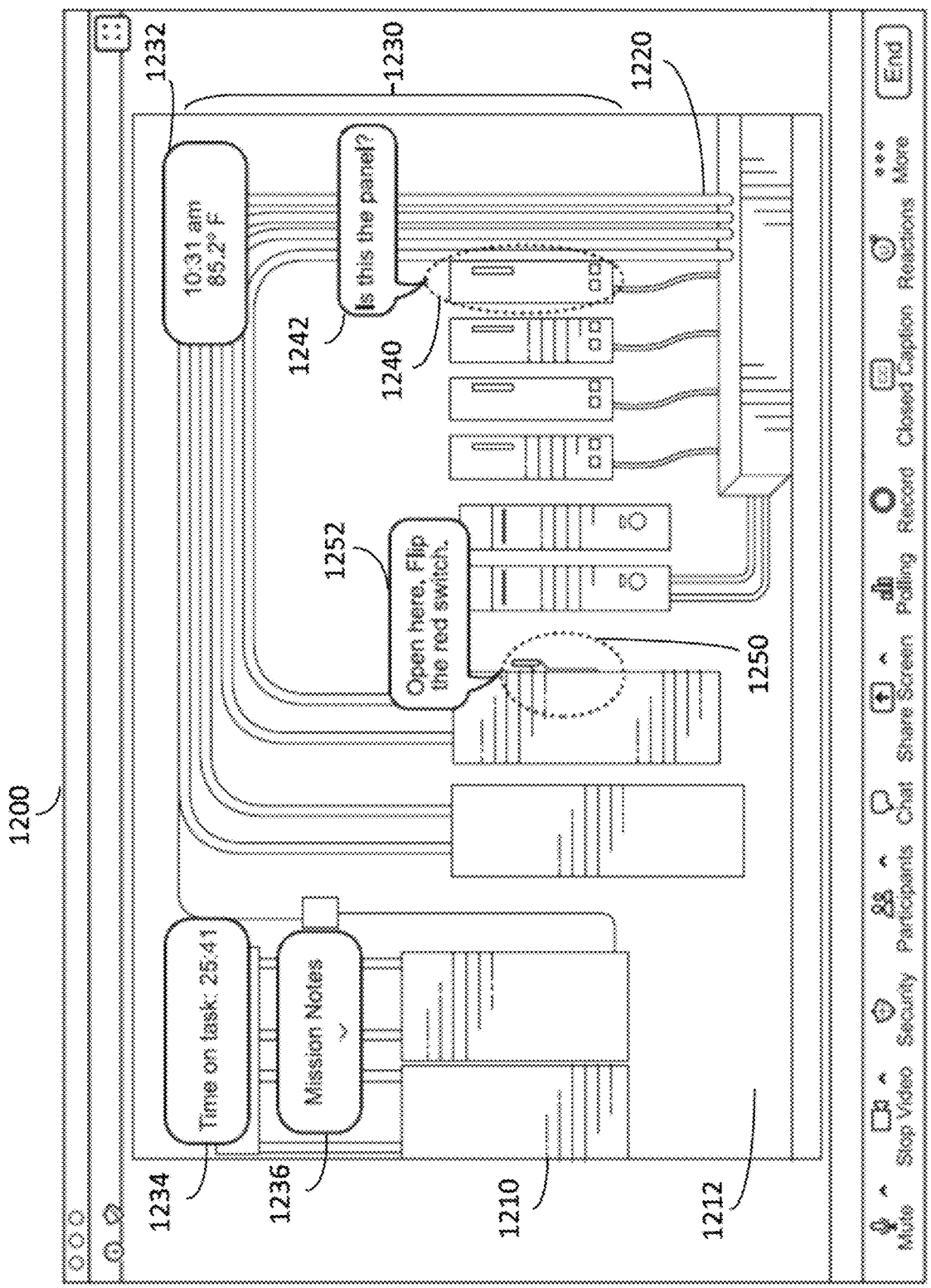
FIG. 12 illustrates an exemplary user interface according to one embodiment of the present disclosure.

FIG. 12 illustrates an exemplary user interface 1200 according to one embodiment of the present disclosure. User interface 1200 of a video conference application may comprise a content view 1210 displaying a video stream of AR view 1212. The video stream may show the view of the AR user including the real-world environment 1220 and virtual environment 1230, including time display 1232, task display 1234, notes display 1236, AR user drawing 1240, AR user annotation 1242, conference participant drawing 1250, and conference participant annotation 1252. In an embodiment, AR objects may be transformed into 2D representations and added to a virtual whiteboard or other container in the video conference application.

In an embodiment, user interface controls may enable a video conference participant 326 to create objects on top of the video stream of AR view 1212. In an embodiment, user interface controls may enable creating representations of real-world objects, shapes, effects, text, annotations, and so on. For example, user interface controls may enable drawing on the video stream to create conference participant drawing 1250 and adding an annotation such as conference participant annotation 1252. Participant created objects may be transformed from 2D objects on the video stream into AR objects, which may comprise 3D objects, in the same manner as described with respect to FIGS. 8 and 10 and elsewhere herein. For example, the 2D objects may be transformed into flat cut outs, displayed as 2D objects in 3D space, extruded in the Z-dimension, transformed into corresponding pre-configured 3D representations, converted into 3D meshes based on depth maps generated by an ML model, or displayed in AR in other ways. The AR objects may be transmitted from the video conference application to the virtual environment 1112 for display to the AR user. The video conference application may attach one or more video conference coordinates of the 2D object identifying the location of the 2D object on the display of the video stream of AR view 1212. The SDK 172 may transform the video conference coordinates into one or more virtual environment coordinates identifying a location in the virtual environment 1112 that corresponds to the location where the 2D object was located on the display of the video stream of AR view 1212, and the virtual environment 1112 may display the AR object at the virtual environment coordinates. AR objects created by video conference participants 326 may allow the participants to assist the AR user and answer queries as the AR user performs tasks.

III. Exemplary Methods

Figure 13:
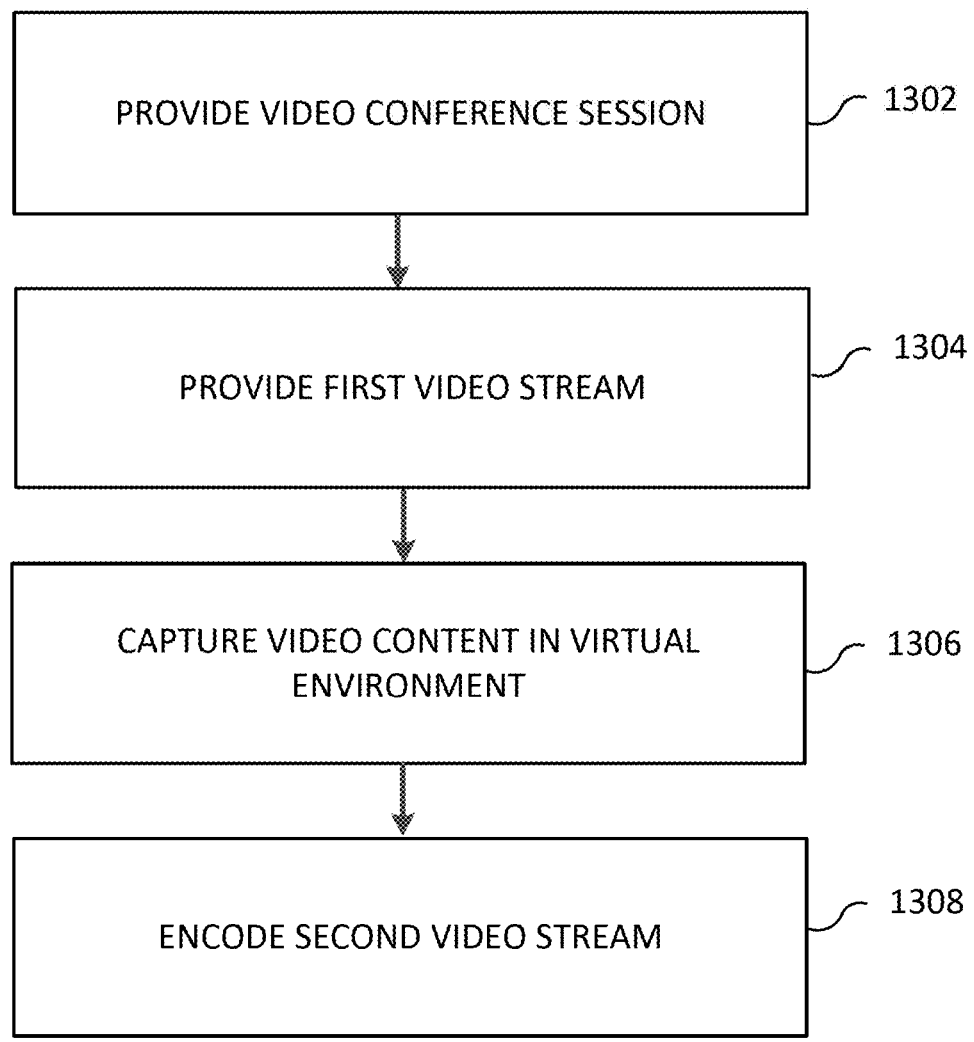
FIG. 13 illustrates an exemplary method that may be performed in some embodiments.

FIG. 13 illustrates an exemplary method 1300 that may be performed in some embodiments.

At step 1302, a video conference session is provided including a first video stream of a video conference participant. In an embodiment, the video conference session is hosted on a server, and the first video stream is received on the server from a video conference application. In an embodiment, the video conference session may connect a plurality of video conference participants.

At step 1304, the first video stream is provided in a virtual environment. In an embodiment, the first video stream may be displayed in the virtual environment, such as on the surface of a 3D object. In an embodiment, the virtual environment may comprise a VR or AR environment, including digital representations of one or more users.

At step 1306, video content is captured from a viewport of a virtual camera in the virtual environment. In an embodiment, the position and facing direction of the virtual camera may be configurable. In an embodiment, the virtual camera has the same location and facing direction as the display of the video stream in the virtual environment.

At step 1308, the video content is encoded to generate a second video stream in the video conference session. In an embodiment, the video content is received on the server from a VR or AR device.

Figure 14:
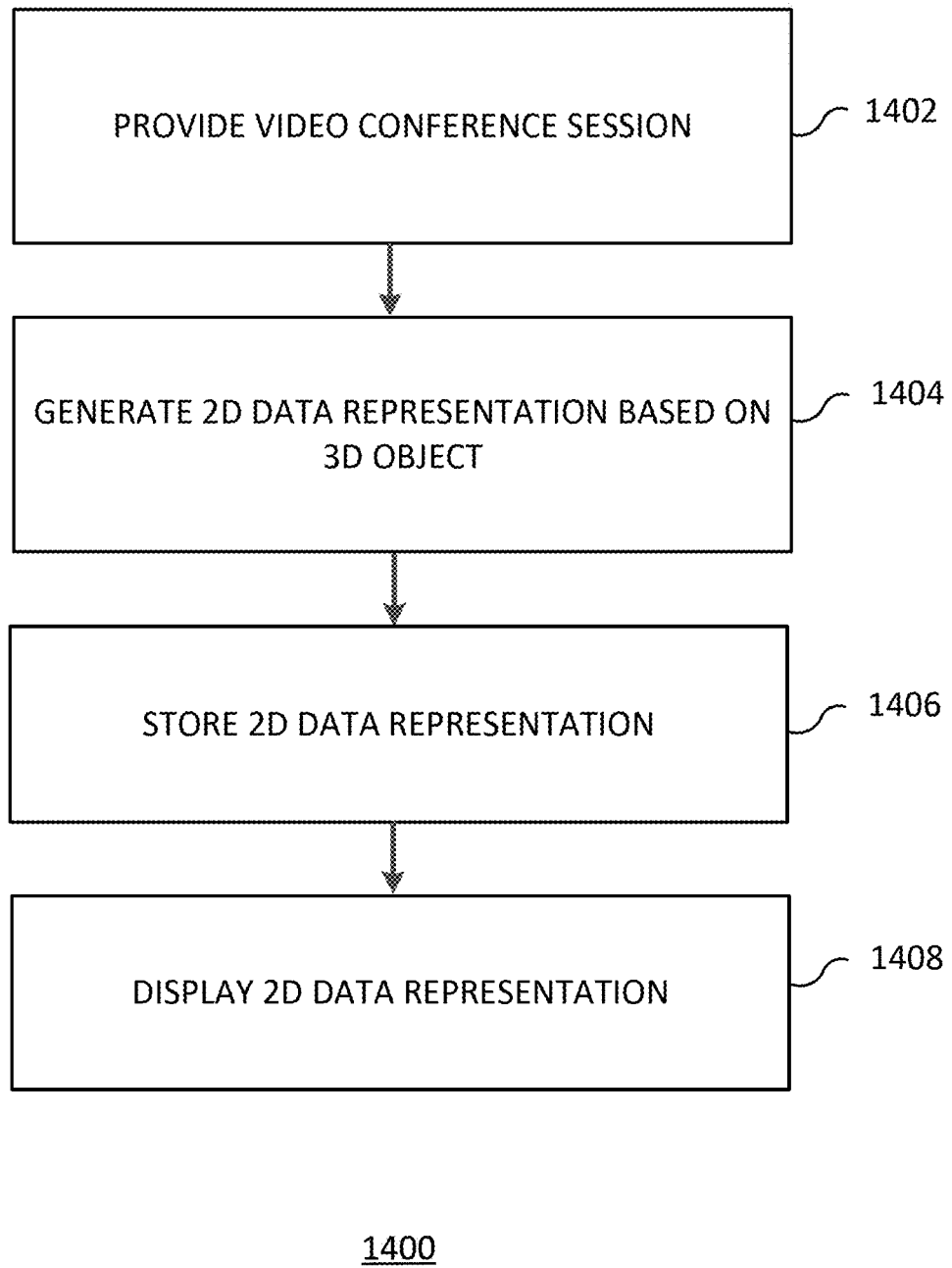
FIG. 14 illustrates an exemplary method that may be performed in some embodiments.

FIG. 14 illustrates an exemplary method 1400 that may be performed in some embodiments.

At step 1402, a video conference session is provided including a first video stream of a video conference participant and a second video stream of a virtual environment. In an embodiment, the virtual environment may comprise a VR environment including 3D avatars of one or more users. In an embodiment, the virtual environment may comprise an AR environment comprising one or more AR holograms.

At step 1404, a 3D data representation of a 3D object in the virtual environment is received and a 2D data representation of the 3D object is generated based on the 3D data representation. In an embodiment, the 2D data representation may comprise a 2D view of the 3D object. In an embodiment, the 2D view of the 3D object may be customized to capture the 3D object from one or more selectable perspectives. In an embodiment, the 3D object is editable in the virtual environment.

At step 1406, the 2D data representation is stored in a container in the video conference session. In an embodiment, the container may comprise a virtual whiteboard, memory buffer, data structure, or database.

At step 1408, the 2D data representation is displayed in the video conference session. In an embodiment, the 2D data representation is stored in a virtual whiteboard in the video conference session, and the virtual whiteboard is displayed in the video conference. In an embodiment, the 2D data representation is editable on the virtual whiteboard by the video conference participant and one or more users in the virtual environment.

Figure 15:
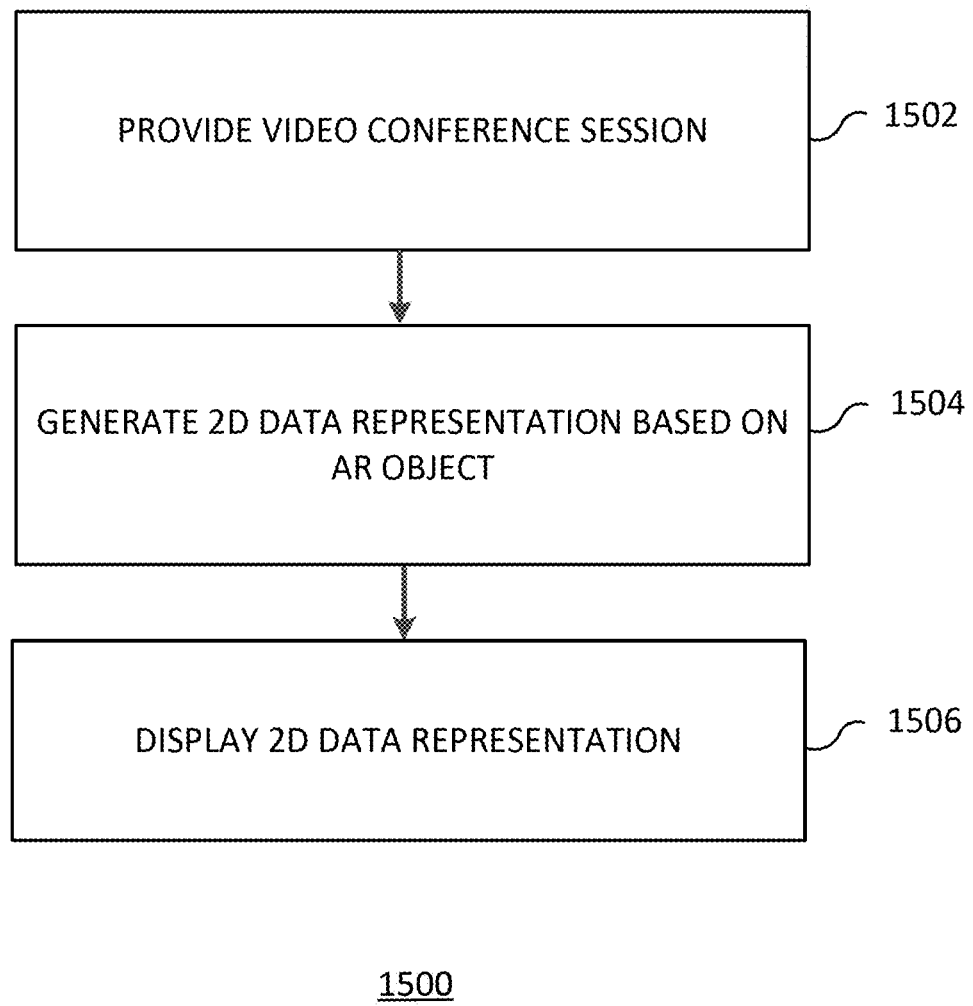
FIG. 15 illustrates an exemplary method that may be performed in some embodiments.

FIG. 15 illustrates an exemplary method 1500 that may be performed in some embodiments.

At step 1502, a video conference session is provided including a first video stream of a video conference participant and a second video stream of an AR view. In an embodiment, the AR view includes real-world content and AR content. In an embodiment, the second video stream is generated by overlaying one or more AR objects on top of captured real-world video.

At step 1504, an AR representation of an AR object in the AR view is received and a 2D data representation of the AR object is generated based on the AR representation. In an embodiment, the 2D data representation may comprise a 2D view of the AR object. In an embodiment, the 2D view of the AR object may be customized to capture the AR object from one or more selectable perspectives.

At step 1506, the 2D data representation is displayed on the second video stream of the AR view in the video conference session. In an embodiment, the 2D data representation may be selectable by the video conference participant to display additional information.

Figure 16:
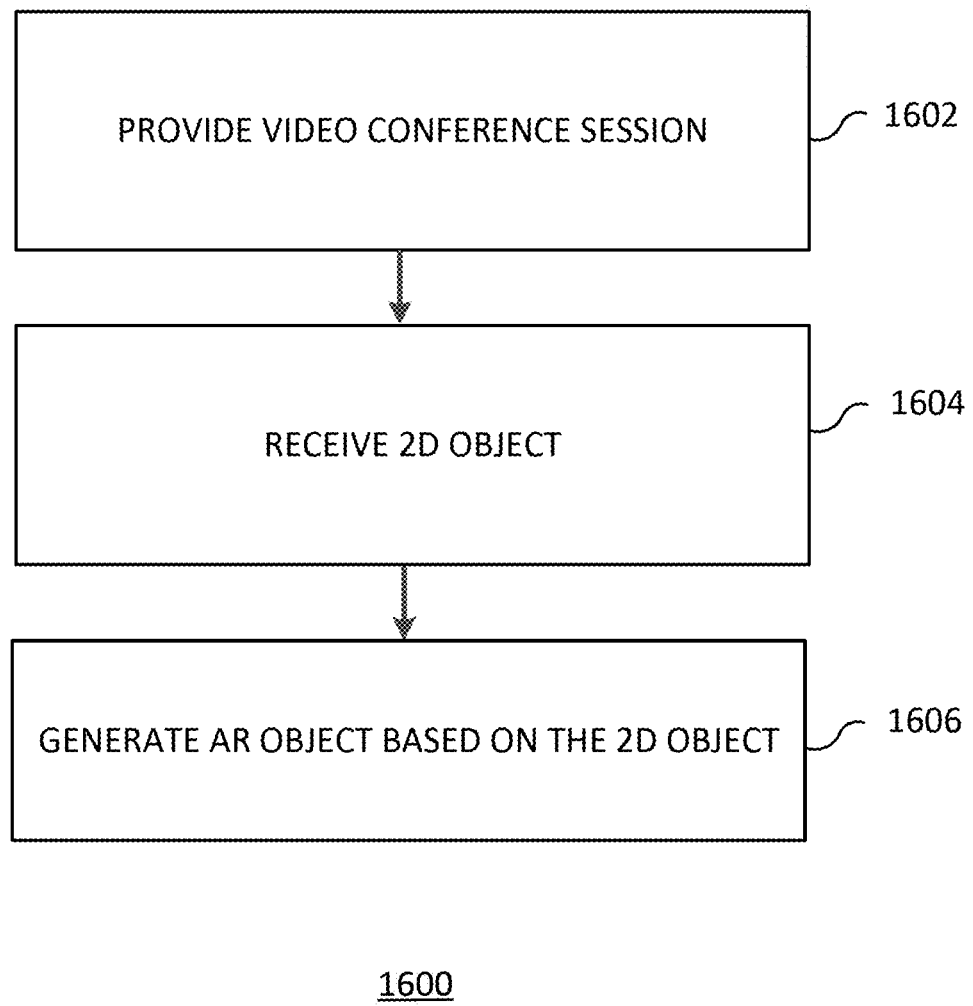
FIG. 16 illustrates an exemplary method that may be performed in some embodiments.

FIG. 16 illustrates an exemplary method 1600 that may be performed in some embodiments.

At step 1602, a video conference session is provided including a first video stream of a video conference participant and a second video stream of an AR view. In an embodiment, the AR view includes real-world content and AR content of an AR environment. In an embodiment, the second video stream is generated by overlaying one or more AR objects on top of captured real-world video.

At step 1604, a 2D object in the video conference session is received for adding to the second video stream of the AR view. In an embodiment, the 2D object may be received in response to user input for creating the 2D object in a video conference application. In an embodiment, the user input is received on a display of the second video stream. In an embodiment, the 2D object may comprise an annotation.

At step 1606, an AR object is generated based on the 2D object and the AR object is provided to an AR environment. In an embodiment, the AR object comprises an AR annotation. In an embodiment, the AR object is displayed in the AR environment.

Exemplary Computer System

Figure 17:
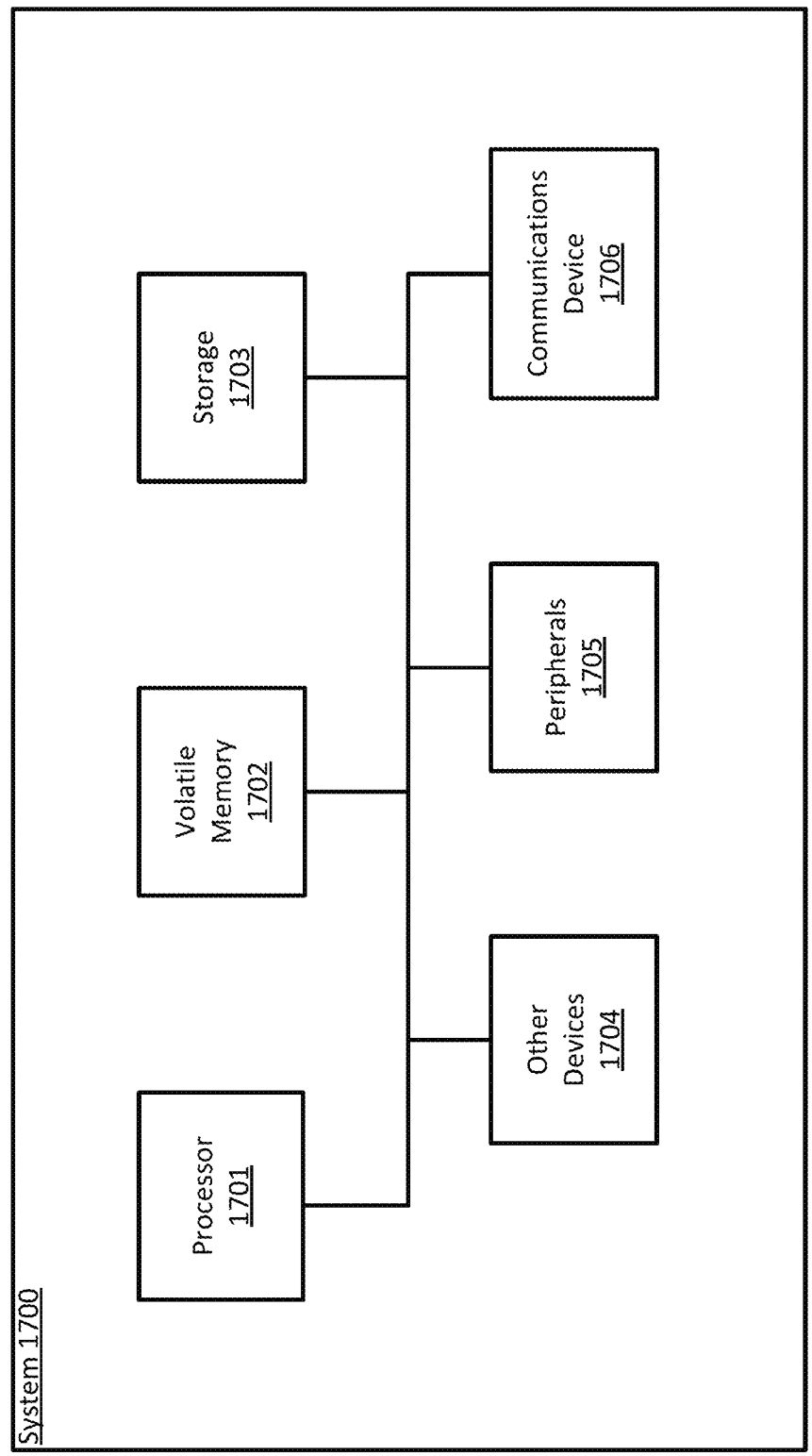
FIG. 17 is a diagram illustrating an exemplary computer that may perform processing in some embodiments.

FIG. 17 is a diagram illustrating an exemplary computer that may perform processing in some embodiments. Exemplary computer 1700 may perform operations consistent with some embodiments. The architecture of computer 1700 is exemplary. Computers can be implemented in a variety of other ways. A wide variety of computers can be used in accordance with the embodiments herein.

Processor 1701 may perform computing functions such as running computer programs. The volatile memory 1702 may provide temporary storage of data for the processor 1701. RAM is one kind of volatile memory. Volatile memory typically requires power to maintain its stored information.

Storage 1703 provides computer storage for data, instructions, and/or arbitrary information. Non-volatile memory, which can preserve data even when not powered and including disks and flash memory, is an example of storage. Storage 1703 may be organized as a file system, database, or in other ways. Data, instructions, and information may be loaded from storage 1703 into volatile memory 1702 for processing by the processor 1701.

The computer 1700 may include peripherals 1705. Peripherals 1705 may include input peripherals such as a keyboard, mouse, trackball, video camera, microphone, and other input devices. Peripherals 1705 may also include output devices such as a display. Peripherals 1705 may include removable media devices such as CD-R and DVD-R recorders/players. Communications device 1706 may connect the computer 1700 to an external medium. For example, communications device 1706 may take the form of a network adapter that provides communications to a network. A computer 1700 may also include a variety of other devices 1704. The various components of the computer 1700 may be connected by a connection medium such as a bus, crossbar, or network.

It will be appreciated that the present disclosure may include any one and up to all of the following examples.

Example 1: A method comprising: providing a video conference session including a first video stream of a video conference participant and a second video stream of a virtual environment; receiving a 3D data representation of a 3D object in the virtual environment and generating a 2D data representation of the 3D object based on the 3D data representation, the 2D data representation comprising a 2D view of the 3D object; storing the 2D data representation in a container in the video conference session; and providing for display the 2D data representation in the video conference session.

Example 2: The method of Example 1, wherein the virtual environment comprises a VR environment including 3D avatars of one or more users.

Example 3: The method of any of Examples 1-2, wherein the virtual environment comprises an AR environment comprising one or more AR holograms.

Example 4: The method of any of Examples 1-3, wherein the 3D object is editable in the virtual environment.

Example 5: The method of any of Examples 1-4, further comprising: storing the 2D data representation in a virtual whiteboard in the video conference session; providing for display the virtual whiteboard in the video conference session; enabling editing of the 2D data representation on the virtual whiteboard by the video conference participant and one or more users in the virtual environment.

Example 6: The method of any of Examples 1-5, further comprising: storing 3D data of the 3D object in the video conference session; uncompressing the 3D object from the 2D data representation in the video conference session to the 3D data representation in the virtual environment based on the 3D data.

Example 7: The method of any of Examples 1-6, further comprising: providing one or more user interface elements for receiving an annotation from the video conference participant; converting the annotation into an AR hologram; transmitting the AR hologram to the virtual environment for display.

Example 8: The method of any of Examples 1-7, further comprising: storing 3D data of the 3D object in the video conference session; receiving edits to the 2D data representation; modifying the 3D data based on the edits; uncompressing the 3D object from the 2D data representation in the video conference session to a modified 3D data representation in the virtual environment based on the modified 3D data.

Example 9: The method of any of Examples 1-8, further comprising: providing user interface controls for generating a 2D object in the video conference session; generating a 3D object in the virtual environment based on the 2D object.

Example 10: The method of any of Examples 1-9, wherein the 3D object is generated by a VR user.

Example 11: The method of any of Examples 1-10, wherein the 3D object is generated by an AR user.

Example 12: The method of any of Examples 1-11, wherein the 2D view is customizable by user interface controls for selecting a virtual camera position around the 3D object.

Example 13: The method of any of Examples 1-12, wherein the video conference session and virtual environment communicate via an SDK.

Example 14: The method of any of Examples 1-13, wherein the 2D data representation is generated through an API.

Example 15: A non-transitory computer readable medium that stores executable program instructions that when executed by one or more computing devices configure the one or more computing devices to perform operations comprising: providing a video conference session including a first video stream of a video conference participant and a second video stream of a virtual environment; receiving a 3D data representation of a 3D object in the virtual environment and generating a 2D data representation of the 3D object based on the 3D data representation, the 2D data representation comprising a 2D view of the 3D object; storing the 2D data representation in a container in the video conference session; and providing for display the 2D data representation in the video conference session.

Example 16: The non-transitory computer readable medium of Example 15, wherein the virtual environment comprises a VR environment including 3D avatars of one or more users.

Example 17: The non-transitory computer readable medium of any of Examples 15-16, wherein the virtual environment comprises an AR environment comprising one or more AR holograms.

Example 18: The non-transitory computer readable medium of any of Examples 15-17, wherein the 3D object is editable in the virtual environment.

Example 19: The non-transitory computer readable medium of any of Examples 15-18, wherein the executable program instructions further configure the one or more computing devices to perform operations comprising: storing the 2D data representation in a virtual whiteboard in the video conference session; providing for display the virtual whiteboard in the video conference session; enabling editing of the 2D data representation on the virtual whiteboard by the video conference participant and one or more users in the virtual environment.

Example 20: The non-transitory computer readable medium of any of Examples 15-19, wherein the executable program instructions further configure the one or more computing devices to perform operations comprising: storing 3D data of the 3D object in the video conference session; uncompressing the 3D object from the 2D data representation in the video conference session to the 3D data representation in the virtual environment based on the 3D data.

Example 21: The non-transitory computer readable medium of any of Examples 15-20, wherein the executable program instructions further configure the one or more computing devices to perform operations comprising: providing one or more user interface elements for receiving an annotation from the video conference participant; converting the annotation into an AR hologram; transmitting the AR hologram to the virtual environment for display.

Example 22: The non-transitory computer readable medium of any of Examples 15-21, wherein the executable program instructions further configure the one or more computing devices to perform operations comprising: storing 3D data of the 3D object in the video conference session; receiving edits to the 2D data representation; modifying the 3D data based on the edits; uncompressing the 3D object from the 2D data representation in the video conference session to a modified 3D data representation in the virtual environment based on the modified 3D data.

Example 23: The non-transitory computer readable medium of any of Examples 15-22, wherein the executable program instructions further configure the one or more computing devices to perform operations comprising: providing user interface controls for generating a 2D object in the video conference session; generating a 3D object in the virtual environment based on the 2D object.

Example 24: The non-transitory computer readable medium of any of Examples 15-23, wherein the 3D object is generated by a VR user.

Example 25: The non-transitory computer readable medium of any of Examples 15-24, wherein the 3D object is generated by an AR user.

Example 26: The non-transitory computer readable medium of any of Examples 15-25, wherein the 2D view is customizable by user interface controls for selecting a virtual camera position around the 3D object.

Example 27: The non-transitory computer readable medium of any of Examples 15-26, wherein the video conference session and virtual environment communicate via an SDK.

Example 28: The non-transitory computer readable medium of any of Examples 15-27, wherein the 2D data representation is generated through an API.

Example 29: A system comprising one or more processors configured to perform the operations of: providing a video conference session including a first video stream of a video conference participant and a second video stream of a virtual environment; receiving a 3D data representation of a 3D object in the virtual environment and generating a 2D data representation of the 3D object based on the 3D data representation, the 2D data representation comprising a 2D view of the 3D object; storing the 2D data representation in a container in the video conference session; and providing for display the 2D data representation in the video conference session.

Example 30: The system of Example 29, wherein the virtual environment comprises a VR environment including 3D avatars of one or more users.

Example 31: The system of any of Examples 29-30, wherein the virtual environment comprises an AR environment comprising one or more AR holograms.

Example 32: The system of any of Examples 29-31, wherein the 3D object is editable in the virtual environment.

Example 33: The system of any of Examples 29-32, wherein the processors are further configured to perform the operations of: storing the 2D data representation in a virtual whiteboard in the video conference session; providing for display the virtual whiteboard in the video conference session; enabling editing of the 2D data representation on the virtual whiteboard by the video conference participant and one or more users in the virtual environment.

Example 34: The system of any of Examples 29-33, wherein the processors are further configured to perform the operations of: storing 3D data of the 3D object in the video conference session; uncompressing the 3D object from the 2D data representation in the video conference session to the 3D data representation in the virtual environment based on the 3D data.

Example 35: The system of any of Examples 29-34, wherein the processors are further configured to perform the operations of: providing one or more user interface elements for receiving an annotation from the video conference participant; converting the annotation into an AR hologram; transmitting the AR hologram to the virtual environment for display.

Example 36: The system of any of Examples 29-35, wherein the processors are further configured to perform the operations of: storing 3D data of the 3D object in the video conference session; receiving edits to the 2D data representation; modifying the 3D data based on the edits; uncompressing the 3D object from the 2D data representation in the video conference session to a modified 3D data representation in the virtual environment based on the modified 3D data.

Example 37: The system of any of Examples 29-36, wherein the processors are further configured to perform the operations of: providing user interface controls for generating a 2D object in the video conference session; generating a 3D object in the virtual environment based on the 2D object.

Example 38: The system of any of Examples 29-37, wherein the 3D object is generated by a VR user.

Example 39: The system of any of Examples 29-38, wherein the 3D object is generated by an AR user.

Example 40: The system of any of Examples 29-39, wherein the 2D view is customizable by user interface controls for selecting a virtual camera position around the 3D object.

Example 41: The system of any of Examples 29-40, wherein the video conference session and virtual environment communicate via an SDK.

Example 42: The system of any of Examples 29-41, wherein the 2D data representation is generated through an API.

Example 43: A method comprising: providing a video conference session including a first video stream of a video conference participant; providing the first video stream in a virtual environment; capturing video content from a viewport of a virtual camera in the virtual environment; encoding the video content to generate a second video stream in the video conference session.

Example 44: The method of Example 43, wherein the first video stream is displayed on the surface of a 3D object in the virtual environment.

Example 45: The method of any of Examples 43-44, wherein the virtual camera has the same location and facing direction as a display of the video stream in the virtual environment.

Example 46: A non-transitory computer readable medium that stores executable program instructions that when executed by one or more computing devices configure the one or more computing devices to perform operations comprising: providing a video conference session including a first video stream of a video conference participant; providing the first video stream in a virtual environment; capturing video content from a viewport of a virtual camera in the virtual environment; encoding the video content to generate a second video stream in the video conference session.

Example 47: The non-transitory computer readable medium of Example 46, wherein the first video stream is displayed on the surface of a 3D object in the virtual environment.

Example 48: The non-transitory computer readable medium of any of Examples 46-47, wherein the virtual camera has the same location and facing direction as a display of the video stream in the virtual environment.

Example 49: A system comprising one or more processors configured to perform the operations of: providing a video conference session including a first video stream of a video conference participant; providing the first video stream in a virtual environment; capturing video content from a viewport of a virtual camera in the virtual environment; encoding the video content to generate a second video stream in the video conference session.

Example 50: The system of Example 49, wherein the first video stream is displayed on the surface of a 3D object in the virtual environment.

Example 51: The system of any of Examples 49-50, wherein the virtual camera has the same location and facing direction as a display of the video stream in the virtual environment.

Example 52: A method comprising: providing a video conference session including a first video stream of a video conference participant and a second video stream of an AR view; receiving an AR representation of an AR object in the AR view and generating a 2D data representation of the AR object based on the AR representation; providing for display the 2D data representation on the second video stream of the AR view in the video conference session.

Example 53: A non-transitory computer readable medium that stores executable program instructions that when executed by one or more computing devices configure the one or more computing devices to perform operations comprising: providing a video conference session including a first video stream of a video conference participant and a second video stream of an AR view; receiving an AR representation of an AR object in the AR view and generating a 2D data representation of the AR object based on the AR representation; providing for display the 2D data representation on the second video stream of the AR view in the video conference session.

Example 54: A system comprising one or more processors configured to perform the operations of: providing a video conference session including a first video stream of a video conference participant and a second video stream of an AR view; receiving an AR representation of an AR object in the AR view and generating a 2D data representation of the AR object based on the AR representation; providing for display the 2D data representation on the second video stream of the AR view in the video conference session.

Example 55: A method comprising: providing a video conference session including a first video stream of a video conference participant and a second video stream of an AR view; receiving a 2D object in the video conference session for adding to the second video stream of the AR view; generating an AR object based on the 2D object and providing the AR object to an AR environment.

Example 56: A non-transitory computer readable medium that stores executable program instructions that when executed by one or more computing devices configure the one or more computing devices to perform operations comprising: providing a video conference session including a first video stream of a video conference participant and a second video stream of an AR view; receiving a 2D object in the video conference session for adding to the second video stream of the AR view; generating an AR object based on the 2D object and providing the AR object to an AR environment.

Example 57: A system comprising one or more processors configured to perform the operations of: providing a video conference session including a first video stream of a video conference participant and a second video stream of an AR view; receiving a 2D object in the video conference session for adding to the second video stream of the AR view; generating an AR object based on the 2D object and providing the AR object to an AR environment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
providing a video conference session, via a video conference application, including a first video stream of a first video conference participant and a second video stream of a virtual environment, the video conference application configured to provide video conferencing among one or more video conference participants;
generating a three-dimensional (3D) object in a virtual environment that is part of the video conference session, wherein the virtual environment is accessed by the first video conference participant and a second video conference participant using the video conference application, and wherein the 3D object includes multiple 3D models at different levels of detail based on how far away users are from the 3D object within the virtual environment;
generating a 3D data representation of the 3D object in the virtual environment, wherein the 3D data representation includes a location and a pose of the 3D object in the video conference session;
ingesting the 3D object to generate a two-dimensional (2D) data representation of the 3D object, the 2D data representation including a 2D view of the 3D object that provides user interface controls to enable editing of the 3D object to participants in the video conference session, wherein the 2D view is of the 3D object within the virtual session, wherein the 2D view of the 3D object is selected using a virtual camera to capture an angle and rotation of the 3D object, wherein 3D users of the video conference application are able to view and edit the 3D data representation of the 3D object at the same time as 2D users of the video conference application are able to view and edit the 2D data representation of the 3D object;
storing the 2D data representation and the 3D data representation in a container in the video conference session; and
providing for display the 2D data representation in the video conference session among the one or more video conference participants.

2. The method of claim 1, wherein the virtual environment comprises a virtual reality (VR) environment including 3D avatars of one or more users.

3. The method of claim 1, wherein the virtual environment comprises an augmented reality (AR) environment comprising one or more AR holograms.

4. The method of claim 1, wherein the 3D object is editable in the virtual environment.

5. The method of claim 1, further comprising:
storing the 2D data representation in a virtual whiteboard in the video conference session;
providing for display the virtual whiteboard in the video conference session; and
enabling editing of the 2D data representation on the virtual whiteboard by the first video conference participant and one or more users in the virtual environment.

6. The method of claim 1, further comprising:
storing 3D data of the 3D object in the video conference session; and
uncompressing the 3D object from the 2D data representation in the video conference session to the 3D data representation in the virtual environment based on the 3D data.

7. The method of claim 1, further comprising:
providing one or more user interface elements for receiving an annotation from the first video conference participant;
converting the annotation into an AR hologram; and
transmitting the AR hologram to the virtual environment for display.

8. A non-transitory computer readable medium that stores executable program instructions that when executed by one or more computing devices configure the one or more computing devices to perform operations comprising:
providing a video conference session, via a video conference application, including a first video stream of a first video conference participant and a second video stream of a virtual environment, the video conference application configured to provide video conferencing among one or more video conference participants;
generating a three-dimensional (3D) object in a virtual environment that is part of the video conference session, wherein the virtual environment is accessed by the first conference participant and a second video conference participant using the video conference application, and wherein the 3D object includes multiple 3D models at different levels of detail based on how far away users are from the 3D object;
generating a 3D data representation of the 3D object in the virtual environment, wherein the 3D data representation includes a location and a pose of the 3D object in the video conference session;
ingesting the 3D object to generate a two-dimensional (2D) data representation of the 3D object, the 2D data representation including a 2D view of the 3D object that provides user interface controls to enable editing of the 3D object to participants in the video conference session, wherein the 2D view is of the 3D object within the virtual session, wherein the 2D view of the 3D object is selected using a virtual camera to capture an angle and rotation of the 3D object, wherein 3D users of the video conference application are able to view and edit the 3D data representation of the 3D object at the same time as 2D users of the video conference application are able to view and edit the 2D data representation of the 3D object;
storing the 2D data representation and the 3D data representation in a container in the video conference session; and
providing for display the 2D data representation in the video conference session.

9. The non-transitory computer readable medium of claim 8, wherein the virtual environment comprises a VR environment including 3D avatars of one or more users.

10. The non-transitory computer readable medium of claim 8, wherein the virtual environment comprises an AR environment comprising one or more AR holograms.

11. The non-transitory computer readable medium of claim 8, wherein the 3D object is editable in the virtual environment.

12. The non-transitory computer readable medium of claim 8, wherein the executable program instructions further configure the one or more computing devices to perform operations comprising:
storing the 2D data representation in a virtual whiteboard in the video conference session; displaying the virtual whiteboard in the video conference session; and
enabling editing of the 2D data representation on the virtual whiteboard by the first video conference participant and one or more users in the virtual environment.

13. The non-transitory computer readable medium of claim 8, wherein the executable program instructions further configure the one or more computing devices to perform operations comprising:
storing 3D data of the 3D object in the video conference session; and
uncompressing the 3D object from the 2D data representation in the video conference session to the 3D data representation in the virtual environment based on the 3D data.

14. The non-transitory computer readable medium of claim 8, wherein the executable program instructions further configure the one or more computing devices to perform operations comprising:
providing one or more user interface elements for receiving an annotation from the first video conference participant;
converting the annotation into an AR hologram; and
transmitting the AR hologram to the virtual environment for display.

15. A system comprising one or more processors configured to perform operations of:
providing a video conference session, via a video conference application, including a first video stream of a first video conference participant and a second video stream of a virtual environment, the video conference application configured to provide video conferencing among one or more video conference participants;
generating a three-dimensional (3D) object in a virtual environment that is part of the video conference session, wherein the virtual environment is accessed by the first video conference participant and a second video conference participant using the video conference application, wherein the 3D object includes multiple 3D models at different levels of detail based on how far away users are from the 3D object within the virtual environment;
generating a 3D data representation of the 3D object in the virtual environment, wherein the 3D data representation includes a location and a pose of the 3D object in the video conference session;
ingesting the 3D object to generate a two-dimensional (2D) data representation of the 3D object, the 2D data representation including a 2D view of the 3D object that provides user interface controls to enable editing of the 3D object to participants in the video conference session, wherein the 2D view is of the 3D object within the virtual session, wherein the 2D view of the 3D object is selected using a virtual camera to capture an angle and rotation of the 3D object, wherein 3D users of the video conference application are able to view and edit the 3D data representation of the 3D object at the same time as 2D users of the video conference application are able to view and edit the 2D data representation of the 3D object;

storing the 2D data representation and the 3D data representation in a container in the video conference session; and providing for display the 2D data representation in the video conference session.

16. The system of claim 15, wherein the virtual environment comprises a VR environment including 3D avatars of one or more users.

17. The system of claim 15, wherein the processors are further configured to perform the operations of:

storing the 2D data representation in a virtual whiteboard in the video conference session; providing for display the virtual whiteboard in the video conference session; and enabling editing of the 2D data representation on the virtual whiteboard by the first video conference participant and one or more users in the virtual environment.

18. The system of claim 15, wherein the processors are further configured to perform the operations of:

providing one or more user interface elements for receiving an annotation from the first video conference participant;

converting the annotation into an AR hologram; and transmitting the AR hologram to the virtual environment for display.

19. The system of claim 15, wherein the video conference session and virtual environment communicate via an SDK.

20. The system of claim 15, wherein the 2D data representation is generated through an API.

* * * * *